US010964971B2

(12) United States Patent
Fang et al.

(10) Patent No.: US 10,964,971 B2
(45) Date of Patent: Mar. 30, 2021

(54) BATTERY CASING AND BATTERY INCLUDING THE SAME

(71) Applicant: SAMSUNG ELECTRONICS CO., LTD., Suwon-si (KR)

(72) Inventors: Feifei Fang, Suwon-si (KR); In Ki Kim, Hwaseong-si (KR); Kyeong Pang, Suwon-si (KR); Joungeun Yoo, Seongnam-si (KR); In Su Lee, Hwaseong-si (KR); Ginam Kim, Seongnam-si (KR); In Kim, Suwon-si (KR); Hyoungwoo Choi, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 153 days.

(21) Appl. No.: 16/225,795

(22) Filed: Dec. 19, 2018

(65) Prior Publication Data
US 2019/0190055 A1    Jun. 20, 2019

(30) Foreign Application Priority Data
Dec. 19, 2017    (KR) .......................... 10-2017-0175568

(51) Int. Cl.
*H01M 10/04*    (2006.01)
*H01M 2/04*    (2006.01)
(Continued)

(52) U.S. Cl.
CPC .......... *H01M 10/049* (2013.01); *C08K 3/346* (2013.01); *C08K 9/04* (2013.01); *C08L 67/02* (2013.01);
(Continued)

(58) Field of Classification Search
None
See application file for complete search history.

(56) References Cited

U.S. PATENT DOCUMENTS

| 5,225,488 A | 7/1993 | Baird et al. |
| 5,352,746 A * | 10/1994 | Asai .................. C08L 67/00 525/437 |

(Continued)

FOREIGN PATENT DOCUMENTS

| CN | 102153738 A | 8/2011 |
| JP | 2830279 B2 | 9/1998 |

(Continued)

OTHER PUBLICATIONS

Tae Young Ha, "Syntheses and Characterizations of Liquid Crystalline Polymer Nanoconnposites," Department of Polymer Science and Engineering, Graduate School Kumoh National Institute of Technology, 2015, 56 pp. English abstract (Year: 2015).*

(Continued)

*Primary Examiner* — Daniel S Gatewood
(74) *Attorney, Agent, or Firm* — Cantor Colburn LLP

(57) ABSTRACT

A battery casing including a container configured to house an electrode assembly, wherein the container includes a bottom wall and a plurality of side walls, the bottom wall and the plurality of side walls are integrated to define an open side opposite to the bottom wall and to define a space for housing the electrode assembly, at least one of the bottom wall and plurality of the side walls includes a composite including a thermotropic liquid crystal polymer and a nanoclay dispersed in the thermotropic liquid crystal polymer, wherein the main chain of the thermotropic liquid crystal polymer includes an aromatic oxycarbonyl repeating unit and an alkylene moiety-containing repeating unit, and at least a portion of the nanoclay is present in an exfoliated state, and an X-ray diffraction pattern of the composite does not exhibit an intrinsic peak corresponding to the nanoclay.

27 Claims, 18 Drawing Sheets

(51) Int. Cl.
*H01M 2/02* (2006.01)
*C08L 67/04* (2006.01)
*C08K 3/34* (2006.01)
*C08L 67/02* (2006.01)
*C08K 9/04* (2006.01)
*C09K 19/38* (2006.01)

(52) U.S. Cl.
CPC .......... *C08L 67/04* (2013.01); *C09K 19/3809* (2013.01); *H01M 2/0257* (2013.01); *H01M 2/0478* (2013.01); *C08L 2203/206* (2013.01); *C08L 2205/12* (2013.01); *H01M 2220/20* (2013.01)

(56) References Cited

U.S. PATENT DOCUMENTS

| | | | |
|---|---|---|---|
| 8,128,844 B2 | 3/2012 | Kim et al. | |
| 9,051,514 B2 | 6/2015 | Nair et al. | |
| 9,096,794 B2 | 8/2015 | Nair et al. | |
| 2005/0233206 A1* | 10/2005 | Puttaiah | H01M 2/0262 429/120 |
| 2018/0205043 A1 | 7/2018 | Kwon et al. | |

FOREIGN PATENT DOCUMENTS

| | | |
|---|---|---|
| KR | 100578769 B1 | 5/2006 |
| KR | 100855799 B1 | 8/2008 |
| KR | 101272516 B1 | 6/2013 |
| KR | 101273982 B1 | 6/2013 |
| KR | 1020140059825 A | 5/2014 |
| KR | 1020170028111 A | 3/2017 |
| WO | 9919402 A1 | 4/1999 |

OTHER PUBLICATIONS

Bo-Soo Seo, et al., "Synthesis and Characterization of Organo-Clay Based AThermotropic Liquid Crystalline Polyester Nanocomposites", Polymer (Korea) vol. 25, No. 6, pp. 876-883 (2001).

Tae Young Ha, "Syntheses and Characterizations of Liquid Crystalline Polymer Nanocomposites," Department of Polymer Science and Engineering, Graduate School Kumoh National Institute of Technology, 2015, 56 pp. English abstract.

Rchard A. Vaia, et al., "Polymer Melt Intercalation in Organically-Modified Layered Silicates: Model Predicitons and Experiment", Macromolecules, 1997, 30, 8000-8009.

* cited by examiner

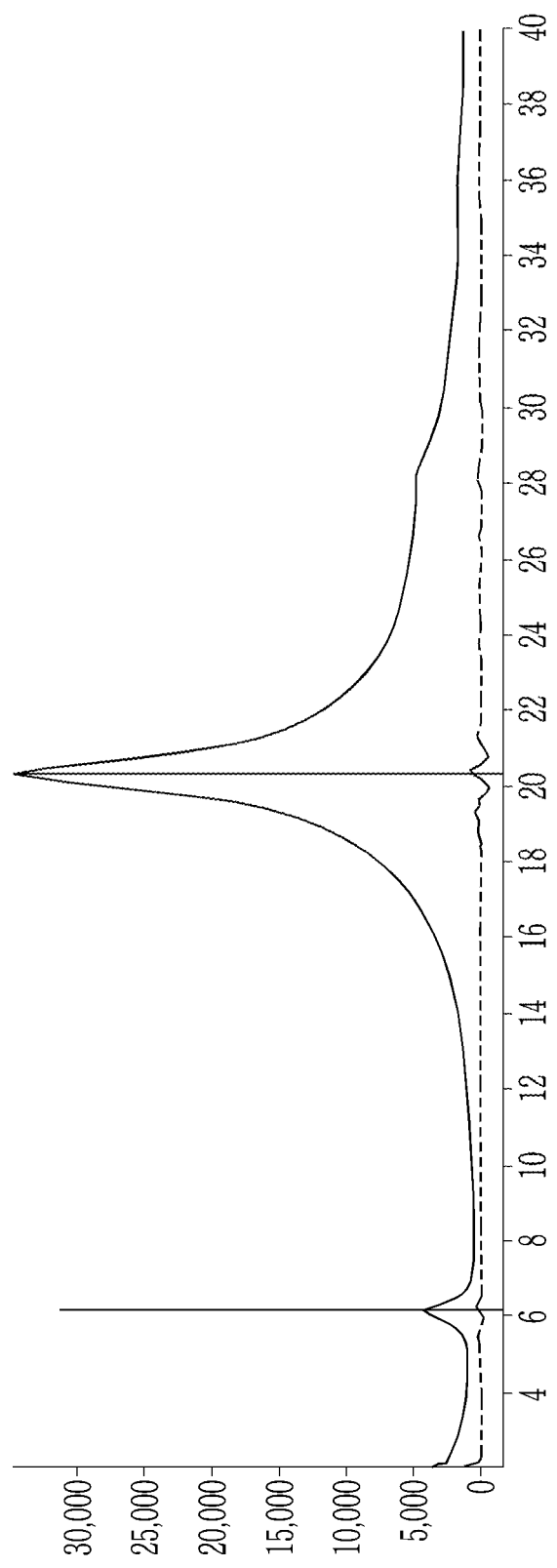

BATTERY CASING AND BATTERY INCLUDING THE SAME

CROSS-REFERENCE TO RELATED APPLICATION

This application claims priority to and the benefit of Korean Patent Application No. 10-2017-0175568 filed in the Korean Intellectual Property Office on Dec. 19, 2017, and all the benefits accruing therefrom under 35 U.S.C. § 119, the entire content of which is incorporated herein by reference.

BACKGROUND

1. Field

A battery casing and a battery including the same are disclosed.

2. Description of the Related Art

As various types of mobile electronic devices and various types of electric transportation are developed, there is a need for improved power sources (e.g., a battery) for supplying the electronic devices/transportation with electricity (or motive power).

The battery may be housed in a casing and disposed individually or as a module in the electronic devices or means of transportation. Accordingly, development of technology capable of improving properties of the casing is needed.

SUMMARY

An embodiment provides a battery casing having improved properties.

Another embodiment provides a battery or a battery module including the battery casing.

In an embodiment, a battery casing includes a container configured to house an electrode assembly, wherein the container includes a bottom wall and a plurality of side walls, the bottom wall and the plurality of side walls are integrated to define an open side opposite to the bottom wall and to define a space for housing the electrode assembly, at least one of the bottom wall and the plurality of side walls includes a composite including a thermotropic liquid crystal polymer and a nanoclay dispersed in the thermotropic liquid crystal polymer, wherein the main chain of the thermotropic liquid crystal polymer includes an aromatic oxycarbonyl repeating unit and an alkylene moiety-containing repeating unit, and at least a portion of the nanoclay is present in an exfoliated state, and an X-ray diffraction pattern of the composite does not exhibit an intrinsic peak corresponding to the nanoclay.

The container may further include a plurality of cell compartments separated by at least one partition wall disposed in the space.

The battery casing may further include a lid configured to cover at least a portion of the open side of the container and including at least one of a positive terminal and a negative terminal.

The lid may include a material which is the same as a material of the container

The aromatic oxycarbonyl repeating unit may include a first repeating unit derived from substituted or unsubstituted p-hydroxybenzoic acid and a second repeating unit derived from an aromatic hydroxycarboxylic acid that does not have a parahydroxybenzoic acid moiety.

In the thermotropic liquid crystal polymer, an amount of the first repeating unit may be greater than or equal to about 30 mole percent (mol %) and less than or equal to about 80 mol %.

The first repeating unit may be derived from a substituted or unsubstituted parahydroxybenzoic acid oligomer having a polymerization degree of about 2 to about 5.

The first repeating unit may include at least two benzene oxycarbonyl moieties.

The aromatic hydroxycarboxylic acid may include m-hydroxybenzoic acid, o-hydroxybenzoic acid, 6-hydroxy-2-naphthoic acid, 5-hydroxy-2-naphthoic acid, 3-hydroxy-2-naphthoic acid, 4'-hydroxyphenyl-4-benzoic acid, 3'-hydroxyphenyl-4-benzoic acid, 4'-hydroxyphenyl-3-benzoic acid, an ester-producible derivative thereof, or a combination thereof.

The ester-producible derivative thereof may include a C1 to C10 alkyl substituted derivative, a C1 to C10 alkoxy substituted derivative, a halogen substituted derivative, an acylation product, an ester derivative, an acid halide, or a combination thereof.

The alkylene moiety-containing repeating unit may include a repeating unit represented by Chemical Formula 1.

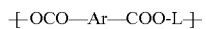   Chemical Formula 1 wherein Ar is a C6 to C40 substituted or unsubstituted aromatic moiety and L is a C1 to C10 (e.g., C1 to C5) alkylene group.

The repeating unit represented by Chemical Formula 1 may include a polyalkylene terephthalate moiety, a polyalkylene naphthalate moiety, or a combination thereof.

An amount of the repeating unit represented by Chemical Formula 1 may be greater than or equal to about 5 mol % and less than or equal to about 15 mol %.

The thermotropic liquid crystal polymer may further include a repeating unit derived from an aromatic dicarboxylic acid, an aromatic diol, or a combination thereof.

The aromatic dicarboxylic acid may include terephthalic acid, isophthalic acid, 2,6-naphthalenedicarboxylic acid, 1,6-naphthalenedicarboxylic acid, 2,7-naphthalenedicarboxylic acid, 1,4-naphthalenedicarboxylic acid, 4,4'-dicarboxylbiphenyl, an ester-producible derivative thereof, or a combination thereof.

The aromatic diol may include hydroquinone, resorcinol, 2,6-dihydroxynaphthalene, 2,7-dihydroxynaphthalene, 1,6-dihydroxynaphthalene, 1,4-dihydroxynaphthalene, 4,4'-dihydroxybiphenyl, 3,3'-dihydroxybiphenyl, 3,4'-dihydroxybiphenyl, 4,4'-dihydroxybiphenylether, an ester-producible derivative thereof, or a combination thereof.

An amount of the nanoclay may be less than about 2.5 parts by weight based on 100 parts by weight of the thermotropic liquid crystal polymer.

An amount of the nanoclay may be less than or equal to about 2 parts by weight based on 100 parts by weight of the thermotropic liquid crystal polymer.

An X-ray diffraction pattern of the composite may not have a peak in a range of about 2 degrees 2θ to about 10 degrees 2θ.

An X-ray diffraction pattern of the composite may not have a peak in a range of about 25 degrees 2θ to about 32 degrees 2θ.

An X-ray diffraction pattern of the composite may have a peak corresponding to the liquid crystal polymer in a range of about 18 degrees 2θ to about 21 degrees 2θ.

The composite may include the nanoclay and a polymerization product of a mixture of a monomer for the thermotropic liquid crystal polymer.

The nanoclay may include smectite, mica, vermiculite, montmorillonite, iron-containing montmorillonite, beidellite, saponite, hectorite, stibnite, nontronite, anionic clay, zirconium phosphate, kaolinite, atapulgite, laponite, illite, halloysite, diatomaceous earth, Fuller's earth, calcined aluminum silicate, hydrated aluminum silicate, magnesium aluminum silicate, sodium silicate, magnesium silicate, or a combination thereof.

The nanoclay may include an organic modified nanoclay having a surface substituted with the organic compound.

The organic compound may include a quaternary ammonium salt having a structure represented by Chemical Formula 2:

$$NTR_3^+A^-$$ Chemical Formula 2 wherein, in Chemical Formula 2, R is hydrogen, a C1 to C30 substituted or unsubstituted alkyl group, or a C6 to C30 aryl group, T is a C3 to C40 substituted or unsubstituted aliphatic or aromatic hydrocarbon group, and $A^-$ is a halide anion.

The substituted or unsubstituted aliphatic or aromatic hydrocarbon group may be methyl, ethyl, propyl, benzyl, hydroxyethyl, or a combination thereof.

The nanoclay may include a nanoclay that does not have a surface that is substituted with an organic compound.

The at least one of the bottom wall and the plurality of side walls including the composite may be a molded article.

The molded article may have an impact strength of greater than or equal to about 20 kilojoules per square meter ($kJ/m^2$) as measured according to ASTM D256.

The molded article may have a water vapor transmittance rate (WVTR) of less than or equal to about 0.05 per square meter per day ($g/m^2day$) as measured at 38° C. and a relative humidity of 100% according to ISO 15106 or ASTM F 1249.

The molded article may not include a defect caused by a loss of the composite from an inlet of an injection mold.

In another embodiment, a composition for producing the composite includes a monomer or an oligomer for the thermotropic liquid crystal polymer; and a nanoclay.

Another embodiment provides a composite which is a polymerization product of the composition or a molded article including the same.

The molded article may be a battery casing.

The battery casing according to an embodiment has improved mechanical properties and improved moisture transmission resistivity. Therefore, the battery or the battery module including the same, may be used for various electronic devices and electric transportation.

BRIEF DESCRIPTION OF THE DRAWINGS

The above and other advantages and features of this disclosure will become more apparent by describing in further detail exemplary embodiments thereof with reference to the accompanying drawings.

FIG. 3D is a graph of intensity (a.u.) versus diffraction angle (degrees 2-theta), which shows an X-ray diffraction spectrum of the nanoclay-polymer composite according to Comparative Example 1-2.

DETAILED DESCRIPTION

Figure 1:
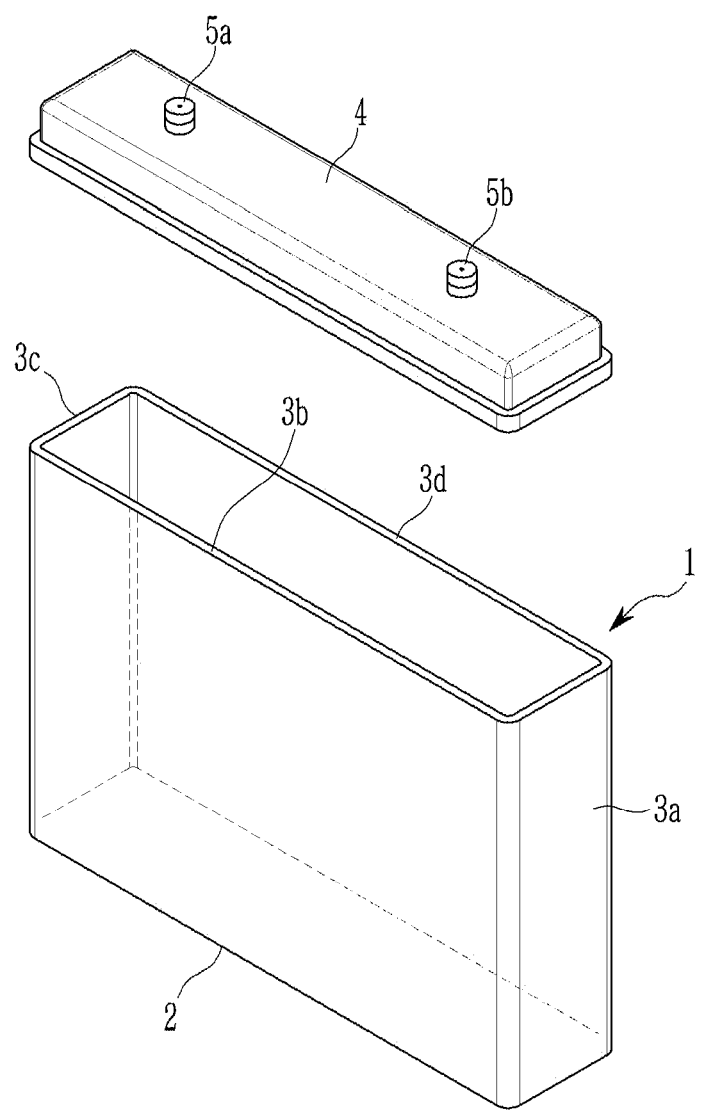
FIG. 1 is an exploded perspective view of a battery casing according to an embodiment.

Advantages and characteristics of this disclosure, and a method for achieving the same, will become evident referring to the following example embodiments together with the drawings attached hereto. However, the embodiments should not be construed as being limited to the embodiments set forth herein. If not defined otherwise, all terms (including technical and scientific terms) in the specification may be defined as commonly understood by one skilled in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. In addition, the term "comprise" and variations such as "comprises" or "comprising", will be understood to imply the inclusion of stated elements but not the exclusion of any other elements.

Further, the singular includes the plural unless mentioned otherwise.

In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±20%, 10% or 5% of the stated value.

As used herein, unless a definition is otherwise provided, "substituted" means that the compound or group is substituted with at least one (e.g., 1, 2, 3, or 4) substituent independently selected from a C1 to C30 alkyl group, a C2 to C30 alkenyl group, a C2 to C30 alkynyl group, a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (—F, —Cl, —Br, or —I), a hydroxy group (—OH), a nitro group (—NO$_2$), a cyano group (—CN), an amino group (—NRR' wherein R and R' are independently hydrogen or a C1 to C6 alkyl group), an azido group (—N$_3$), an amidino group (—C(=NH)NH$_2$), a hydrazino group (—NHNH$_2$), a hydrazono group (=N(NH$_2$)), an aldehyde group (—C(=O)H), a carbamoyl group (—C(O)NH$_2$), a thiol group (—SH), an ester group (—C(=O)OR, wherein R is a C1 to C6 alkyl group ora C6 to C12 aryl group), a carboxyl group (—COOH), a carboxylic acid salt (—C(=O)OM, wherein M is an organic or inorganic cation), a sulfonic acid group (—SO$_3$H), a sulfonic acid salt (—SO$_3$M, wherein M is an organic or inorganic cation), a phosphoric acid group (—PO$_3$H$_2$), a phosphoric acid salt thereof (—PO$_3$MH or PO$_3$M$_2$, wherein M is an organic or inorganic cation), and a combination thereof.

As used herein, "alkylene group" refers to a straight or branched chain, saturated, divalent aliphatic hydrocarbon group, optionally substituted with at least one substituent.

As used herein, "arylene group" refers to divalent group formed by the removal two hydrogen atoms from at least one aromatic ring, wherein the hydrogen atom may be removed from the same or different ring, and optionally substituted with at least one substituent.

A battery casing according to an embodiment includes a container configured to house an electrode assembly. The container includes a bottom wall and a plurality of side walls. The bottom wall and the plurality of side walls are integrated to define an open side opposite to the bottom wall and to plurality of a space for housing the electrode assembly. Herein, "integrated" refers to the case in which a plurality of elements (e.g., bottom wall and/or side wall) are combined with a junction part or a seam connecting the combined elements and also to a case where the plurality of the elements are connected to one another without the junction part or the seam. In an embodiment, the plurality of the elements may be combined, for example, by using a mold having a desired shape. In other embodiments, adjacent components can be glued together or mechanically connected.

At least one of the bottom wall and the plurality of side walls (e.g., both of the bottom wall and the side walls) includes a composite including a thermotropic liquid crystal polymer and a nanoclay dispersed in the thermotropic liquid crystal polymer. The main chain of the thermotropic liquid crystal polymer includes an aromatic oxycarbonyl repeating unit and an alkylene moiety-containing repeating unit, and at least a portion of the nanoclay is present in an exfoliated state and, an X-ray diffraction pattern of the composite does not exhibit an intrinsic peak corresponding to the nanoclay.

FIG. 1 is an exploded perspective view of a battery casing according to an embodiment. Referring to FIG. 1, in a battery casing according to an embodiment, a bottom wall 2 and a plurality (e.g., 3, 4, or more) of side walls 3a, 3b, 3c, and 3d are integrated to provide a container 1. A method of integrating is not particularly limited and may be determined appropriately. For example, a composite that will be described later is molded (e.g., injection molded) or connected together to provide a molded article including an integrated bottom wall and a plurality of side walls. The container 1 has an open side which is opposite to the bottom wall 2 and through which an electrode assembly is inserted into the container 1 in order to house the electrode assembly. A battery casing according to an embodiment may further include a lid 4 to close (e.g., seal) at least a portion (e.g., whole part) of the open side of the container 1. For example, the lid may cover all of the open side of the container. The lid 4 may include at least one of the positive terminal 5a or the negative terminal 5b (e.g., positive terminal and negative terminal). The lid 4 may include the same material as the container 1. Alternatively, the lid 4 may include a different material than the container 1.

Figure 2:
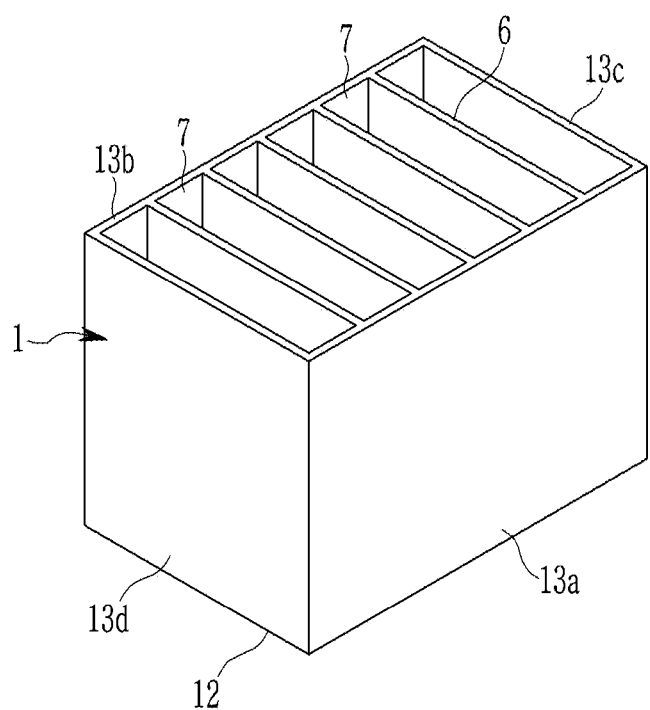
FIG. 2 is an exploded perspective view of a battery casing according to another embodiment.

FIG. 2 is an exploded perspective view of a battery casing according to another embodiment. Referring to FIG. 2, the container 1 of the battery casing according to an embodiment includes side walls 13a, 13b, 13c, and 13d and a bottom wall 12 that are integrated with each other to form a space. In the space, at least one partition wall 6 may be disposed, and thereby the container may include a plurality of cell compartments 7. The number of partition walls may be 1, 2, 3, 4, 5, or greater, but is not limited thereto. The number of cell compartments may be 2 or more, for example, 3 or more, 4 or more, or 5 or more, and is determined by the number of partition walls. Each cell compartment may house an electrode assembly that will be described later.

The electrode assembly may be disposed in the space to manufacture a battery or a battery module. In order to provide the electrode assembly with an electrolyte solution, an electrolyte solution may be injected into the space after disposing the electrode assembly. The open side of the battery casing may be closed and sealed with the lid after disposing the electrode assembly.

FIGS. 1 and 2 show a rectangular parallelepiped battery casing, but the battery casing according to an embodiment has no limit to the shape but may have various shapes and sizes and various number of containers.

There remains a need for the development of a battery or a battery module having improved properties for use in various types of mobile electronic device and various types of electric transportation means (EV, referred to as electric vehicle). For example, an electric vehicle may use a battery or a battery module in order to provide a portion or all of a motive power. Such a battery or battery module may include a rechargeable lithium battery capable of charging and discharging and having a relatively high energy density. In the case of the rechargeable lithium battery, moisture which has permeated into a battery exterior casing may cause the generation of hydrofluoric acid (HF) and thus electrode performance may be seriously decreased. Therefore, a battery module including the rechargeable lithium battery includes an aluminum-based material having relatively high moisture transmission resistivity. For example, a battery module including the rechargeable lithium battery may be manufactured by inserting an electrode assembly including a positive electrode, a negative electrode, and a separator into a casing of an aluminum pouch and aluminum can, sealing the same to a manufacture a battery cell, and integrating a plurality of the battery cells. Such an assembly/manufacturing process is complicated and needs a long time and high cost. It would be desirable to provide a plastic based battery casing having the desirable properties (e.g., improved mechanical properties and moisture transmission resistivity) without the need to use an aluminum pouch/casing to seal at least one electrode assembly in the battery casing. In addition, a metal based battery casing has a limit in terms of a shape/size and thus needs a plurality of steps in order to embody various shapes and/or sizes. The metal based battery casing is heavy and thus it is difficult to realize a light-weight battery (module) for housing a battery cell having a large size and/or a plurality of battery cells.

A battery casing according to an embodiment may not include a metal layer (e.g., aluminum layer), and has a significantly reduced weight compared with a conventional battery casing including a metal material, due to the use of a plastic material (e.g., polyethylene polymer). The battery casing also has improved mechanical properties and moisture transmission resistivity.

Accordingly, in a battery casing according to an embodiment, at least one of the bottom wall and the plurality of side walls may include a composite including a thermotropic liquid crystal polymer (e.g., a semi-aromatic liquid crystal polyester) including an aromatic oxycarbonyl repeating unit and an alkylene moiety-containing repeating unit (hereinafter, aliphatic dioxy repeating unit) in the main chain; and a nanoclay dispersed in the thermotropic liquid crystal polymer. At least a portion of the nanoclay may be present in an exfoliated state and an X-ray diffraction pattern of the composite does not exhibit an intrinsic peak corresponding to the nanoclay in. In an embodiment, the composite may be in a form of a molded article (e.g., injection molded).

In the thermotropic liquid crystal polymer, an amount of the aromatic oxycarbonyl repeating unit may be greater than or equal to about 30 mole percent (mol %), for example, greater than or equal to about 40 mol %, greater than or equal to about 50 mol %, or greater than or equal to about 60 mol % based on a total mole number of the repeating units. In the thermotropic liquid crystal polymer, an amount of the aromatic oxycarbonyl repeating unit may be less than or equal to about 99 mol %, for example, less than or equal to about 95 mol %, less than or equal to about 90 mol %, less than or equal to about 80 mol %, or less than or equal to about 70 mol %.

The aromatic oxycarbonyl repeating unit may include a first repeating unit derived from a substituted or unsubstituted p-hydroxybenzoic acid (HBA). The first repeating unit may be represented by the following Formula A.

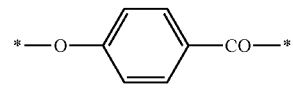

Formula A

Herein, in the chemical formula A, * indicates a point of attachment to an adjacent unit, and the aromatic ring (i.e., phenylene ring) may be unsubstituted or substituted.

In the thermotropic liquid crystal polymer, an amount of the first repeating unit may be greater than or equal to about 30 mol %, for example, greater than or equal to about 35 mol %, greater than or equal to about 40 mol %, greater than or equal to about 45 mol %, greater than or equal to about 46 mol %, greater than or equal to about 47 mol %, greater than or equal to about 48 mol %, greater than or equal to about 49 mol %, greater than or equal to about 50 mol %, greater than or equal to about 51 mol %, greater than or equal to about 52 mol %, greater than or equal to about 53 mol %, greater than or equal to about 54 mol %, greater than or equal to about 55 mol %, greater than or equal to about 56 mol %, greater than or equal to about 57 mol %, greater than or equal to about 58 mol %, or greater than or equal to about 59 mol %, based on a total mole number of the repeating units. In the thermotropic liquid crystal polymer according to an embodiment, an amount of the first repeating unit may be less than or equal to about 99 mol %, for example, less than or equal to about 90 mol %, less than or equal to about 85 mol %, less than or equal to about 80 mol %, less than or equal to about 75 mol %, or less than or equal to about 70 mol %, based on a total mole number of the repeating units.

The first repeating unit may be derived from a substituted or unsubstituted parahydroxybenzoic acid oligomer having a polymerization degree of about 2 to about 5. For example, the first repeating unit of the thermotropic liquid crystal polymer may include at least two benzeneoxycarbonyl moieties. Accordingly, the thermotropic liquid crystal polymer may be a block copolymer including a block of the first repeating unit. Without being bound by any theory, it is believed that the block copolymer may provide increased regularity in a repeating unit sequence of a polymer chain compared with a random polymer, and this regularity may contribute to an improved moisture transmission resistivity of a casing. Without being bound by any theory, the thermotropic liquid crystal polymer including a HBA block may have improved packing density of a polymer chain along with a decreased free volume among the polymer chains and thus may have improved properties (e.g., improved barrier properties and improved impact characteristics).

This increased regularity in the polymer chain may be determined by an area ratio of two split peaks shown by the first repeating unit as measured by nuclear magnetic resonance (NMR) analysis of the prepared polymer. In an embodiment, the first repeating unit may have a first peak (e.g., around 8.30 ppm) and a second peak (e.g., around 8.33 ppm), where the second peak has a larger δ than the first peak in the nuclear magnetic resonance analysis, and the ratio of the first peak area relative to the second peak area may be greater than or equal to about 0.8, for example, greater than or equal to about 0.9, or greater than or equal to about 1, as determined through curve fitting using Mnova software. The block copolymer may be obtained by separately preparing a HBA oligomer, inputting the HBA oligomer in a thermotropic liquid crystal polymer polymerization step, and performing a polymerization reaction.

The aromatic oxycarbonyl repeating unit may further include a second repeating unit derived from aromatic hydroxycarboxylic acid that does not have a parahydroxybenzoic acid moiety. The second repeating unit may be represented by Chemical Formula A-1:

 Formula A-1 wherein, * indicates a point of attachment to an adjacent repeating unit and $Ar_1$ is one of the following chemical formulae:

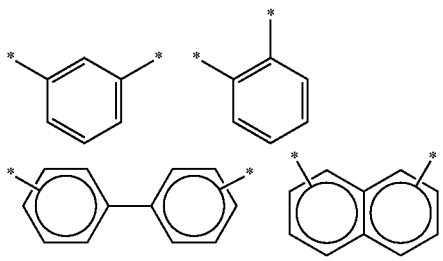

wherein, * indicates a point of attachment to oxygen or a carbon of a carbonyl group.

In an embodiment, the aromatic hydroxycarboxylic acid may include m-hydroxybenzoic acid, o-hydroxybenzoic acid, 6-hydroxy-2-naphthoic acid, 5-hydroxy-2-naphthoic acid, 3-hydroxy-2-naphthoic acid, 4'-hydroxyphenyl-4-benzoic acid, 3'-hydroxyphenyl-4-benzoic acid, 4'-hydroxyphenyl-3-benzoic acid, an ester-producible derivative thereof, or a combination thereof. As referred to herein, the "ester-producible derivative" thereof refers to a derivative capable of forming an ester group during a reaction and may be a C1 to C10 alkyl substituted derivative, a C1 to C10 alkoxy substituted derivative, a halogen substituted derivative, an acylation product, an ester derivative, an acid halide, or a combination thereof, but is not limited thereto.

An amount of the second repeating unit may be greater than or equal to about 0 mol, greater than or equal to about 5 mol, greater than or equal to about 10 mol, or greater than or equal to about 20 mol, per 100 mol of the first repeating unit. An amount of the second repeating unit may be less than or equal to about 100 mol, for example less than or equal to about 90 mol, less than or equal to about 80 mol, less than or equal to about 70 mol, less than or equal to about 60 mol, less than or equal to about 55 mol, less than or equal to about 50 mol, less than or equal to about 45 mol, or less than or equal to about 40 mol, per 100 mol of the first repeating unit.

In the thermotropic liquid crystal polymer, the aliphatic dioxy repeating unit may include a repeating unit represented by Chemical Formula 1:

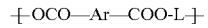 Chemical Formula 1 wherein Ar is a C6 to C40 substituted or unsubstituted aromatic moiety, and L is a C1 to C10 alkylene (e.g., methylene, ethylene, propylene, isopropylene, butylene, isobutylene, pentylene, isopentylene, hexylene, and the like).

In an embodiment, Ar of Chemical Formula 1 may be represented by one of the following chemical formulae:

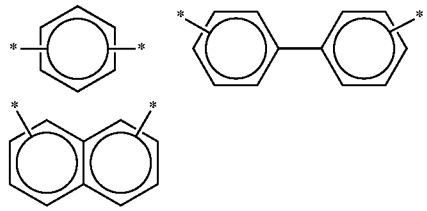

In the thermotropic liquid crystal polymer, an amount of the aliphatic dioxy repeating unit may be greater than or equal to about 1 mol %, for example greater than or equal to about 2 mol %, greater than or equal to about 3 mol %, greater than or equal to about 4 mol %, greater than or equal to about 5 mol %, greater than or equal to about 6 mol %, greater than or equal to about 7 mol %, greater than or equal to about 8 mol %, or greater than or equal to about 9 mol %, based on a total mole number of the repeating units. In the thermotropic liquid crystal polymer, the amount of the aliphatic dioxy repeating unit may be less than or equal to about 70 mol %, less than or equal to about 60 mol %, less than or equal to about 50 mol %, less than or equal to about 40 mol %, less than or equal to about 30 mol %, less than or equal to about 25 mol %, less than or equal to about 20 mol %, less than or equal to about 19 mol %, less than or equal to about 18 mol %, less than or equal to about 17 mol %, less than or equal to about 16 mol %, or less than or equal to about 15 mol %, based on a total mole number of the repeating units.

The repeating unit represented by Chemical Formula 1 may include a polyalkylene terephthalate moiety, a polyalkylene isophthalate moiety, polyalkylene naphthalate moiety, or a combination thereof. For example, the repeating unit represented by Chemical Formula 1 may include a polyethylene terephthalate moiety, a polyethylene isophthalate moiety, polyethylene naphthalate moiety, or a combination thereof.

The thermotropic liquid crystal polymer may further include an aromatic dicarbonyl repeating unit represented by Chemical Formula A-2, an aromatic dioxy repeating unit represented by Chemical Formula A-3, or a combination thereof, and is referred to hereinafter as "additional aromatic repeating unit":

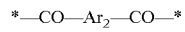 Chemical Formula A-2

 Chemical Formula A-3 wherein, * indicates a point of attachment to an adjacent repeating unit and $Ar_2$ and $Ar_3$ are independently one of the following chemical formulae:

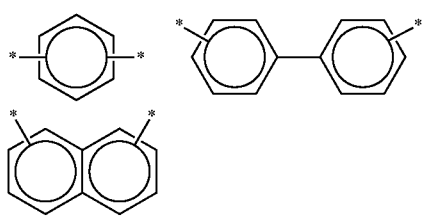

wherein, * indicates a point of attachment to an adjacent atom (e.g., oxygen or carbonyl carbon).

The aromatic dicarbonyl repeating unit represented by Chemical Formula A-2 may be a repeating unit derived from an aromatic dicarboxylic acid. The aromatic dicarboxylic acid may include 1,6-naphthalenedicarboxylic acid, 2,7-naphthalenedicarboxylic acid, 1,4-naphthalenedicarboxylic acid, 4,4'-dicarboxylbiphenyl, an ester-producible derivative thereof, or a combination thereof. The aromatic dioxy repeating unit represented by Chemical Formula A-3 may be a repeating unit derived from aromatic diol. The aromatic diol may include hydroquinone, resorcinol, 2,6-dihydroxynaphthalene, 2,7-dihydroxynaphthalene, 1,6-dihydroxynaphthalene, 1,4-dihydroxynaphthalene, 4,4'-dihydroxybiphenyl, 3,3'-dihydroxybiphenyl, 3,4'-dihydroxybiphenyl, 4,4'-dihydroxybiphenylether, an ester-producible derivative thereof, or a combination thereof.

In the thermotropic liquid crystal polymer, an amount of the additional aromatic repeating unit is not particularly limited and may be appropriately selected. In an embodiment, an amount of the aromatic dicarbonyl repeating unit may be greater than or equal to about 1 mol %, for example, greater than or equal to about 2 mol %, greater than or equal to about 3 mol %, greater than or equal to about 4 mol %, greater than or equal to about 5 mol %, greater than or equal to about 6 mol %, greater than or equal to about 7 mol %, greater than or equal to about 8 mol %, greater than or equal to about 9 mol %, or greater than or equal to about 10 mol %, based on a total mole number of the repeating units in the thermotropic liquid crystal polymer. In an embodiment, an amount of the aromatic dicarbonyl repeating unit may be less than or equal to about 50 mol %, for example, 45 mol %, less than or equal to about 40 mol %, less than or equal to about 35 mol %, less than or equal to about 30 mol %, less than or equal to about 25 mol %, less than or equal to about 20 mol %, based on a total mole number of the repeating units in the thermotropic liquid crystal polymer. In an embodiment, an amount of the aromatic dioxy repeating unit may be greater than or equal to about 1 mol %, for example, 2 mol %, greater than or equal to about 3 mol %, greater than or equal to about 4 mol %, greater than or equal to about 5 mol %, greater than or equal to about 6 mol %, greater than or equal to about 7 mol %, greater than or equal to about 8 mol %, greater than or equal to about 9 mol %, or greater than or equal to about 10 mol %, based on a total mole number of the repeating units in the thermotropic liquid crystal polymer. In an embodiment, an amount of the aromatic dioxy repeating unit may be less than or equal to about 50 mol %, for example, 45 mol %, less than or equal to about 40 mol %, less than or equal to about 35 mol %, less than or equal to about 30 mol %, less than or equal to about 25 mol %, or less than or equal to about 20 mol %, based on a total mole number of the repeating units in the thermotropic liquid crystal polymer.

A thermotropic liquid crystal polymer having an aromatic polyester moiety may have relatively improved mechanical properties and improved heat resistance. The thermotropic liquid crystal polymer may have liquid crystallinity in a thermal melt state and may be oriented with a flow direction in the liquid crystal state. The thermotropic liquid crystal polymer includes a mesogen having a rigid rod structure and thus may have a relatively high melting point (e.g., greater than or equal to about 300° C.). For example, polyhydroxybenzoic acid has a melting point of greater than about 600° C. and thus is decomposed before showing a liquid crystal phase. Because of this high melting point, the liquid crystal polymer is difficult to process into a melt (e.g., eject and the like).

Since the thermotropic liquid crystal polymer includes a mesogen moiety including a benzene ring and an ester group, polymer chains may be uniaxially aligned during a thermal molding process such as an injection molding process, and accordingly, the composite may display a liquid crystal polymer (LCP) characteristic peak by X-ray diffraction analysis, after the thermal molding process. Because of the uniaxial orientation characteristics, the composite including the thermotropic liquid crystal polymer, or an article molded therefrom, may show relatively low impact strength. In order to improve properties (e.g., moisture transmission resistivity or impact strength) of the thermotropic liquid crystal polymer, use of a reinforcing material (e.g., an inorganic filler, etc.) has been suggested. However, the inventors have found that the reinforcing material does not substantially improve the properties of the molded article including the thermotropic liquid crystal polymer. In addition, the addition of the reinforcing material may lead to substantial decrease in impact strength of the molded article and even make production of the molded article impossible. A molded article based on a thermotropic liquid crystal polymer and having increased impact resistance while maintaining improved moisture transmission resistivity, would be beneficial.

On the other hand, there is a need to develop a battery or a battery module having improved properties for various types of mobile electronic devices and various types of electric transportation means (EV, referred to as an electric vehicle). For example, an electric vehicle may use a battery or a battery module to provide a portion or all of a motive power. Such a battery or battery module may include a rechargeable lithium battery capable of charging and discharging and having a relatively high energy density. In the case of the rechargeable lithium battery, moisture permeating a battery exterior casing may cause generation of hydrofluoric acid (HF) and thus electrode performance may be seriously decreased. As a result, a battery module including the rechargeable lithium battery includes an aluminum-based material having relatively high moisture transmission resistivity. For example, a battery module including the rechargeable lithium battery may be manufactured by inserting an electrode assembly including a positive electrode, a negative electrode, and a separator, into a casing of an aluminum pouch and aluminum can, sealing the same to manufacture a battery cell, and integrating a plurality of battery cells. Such an assembly/manufacturing process is complicated and involves a long manufacturing time and high manufacturing cost. There thus remains a need for a plastic battery casing having improved properties (e.g., improved impact properties and moisture transmission resistivity) and which is able to seal at least one electrode assembly in the battery casing without the need for an aluminum pouch/casing. In addition, a metal battery casing has a limit in terms of a shape/size and thus numerous steps are performed to realize various shapes and/or sizes. The metal based battery casing is heavy making it difficult to realize a light-weight battery (module) capable of housing a battery cell having a large size and/or a plurality of battery cells.

A battery casing according to an embodiment may provide sufficient impact resistance and moisture transmission resistivity by including the composite in a least one of the bottom wall and the plurality of side walls, even though the walls are formed of a plastic based material. The composite according to an embodiment includes a nanoclay dispersed in the thermotropic liquid crystal polymer and at least a portion of the nanoclay is present in an exfoliated state (e.g., as an exfoliated nanoclay particle) and the X-ray diffraction pattern of the composite does not exhibit an intrinsic peak corresponding to the nanoclay.

An amount of the nanoclay may be less than about 2.5 parts by weight, based on 100 parts by weight of the thermotropic liquid crystal polymer. Within the above-described range, a molded article produced from the composite may have improved impact strength. A molded article produced from a composite in which the amount of the nanoclay is outside of the above-described range, may not provide an article due to formation of foam during a molding process. The molded article produced from a composite in which the amount of the nanoclay is outside of the above-described range may exhibit lower impact strength or a similar impact strength relative to the molded article produced from a composite without a clay.

An amount of the nanoclay may be less than or equal to about 2 parts by weight, for example, less than or equal to about 1.5 parts by weight, less than or equal to about 1.3 parts by weight, or less than or equal to about 1 part by weight, based on 100 parts by weight of the thermotropic liquid crystal polymer.

The nanoclay may include smectite, mica, vermiculite, montmorillonite, iron-containing montmorillonite, beidellite, saponite, hectorite, stibensite, nontronite, anionic clay, zirconium phosphate, kaolinite, atapulgite, laponite, illite, halloysite, diatomaceous earth, Fuller's earth, calcined aluminum silicate, hydrated aluminum silicate, magnesium aluminum silicate, sodium silicate, magnesium silicate, or a combination thereof. In an embodiment, the nanoclay may include silicate. The nanoclay may have a sheet-shape having a nano-sized thickness when examined by a transmission electron microscope. The nanoclay particle may have an aspect ratio of about 20 to about 10,000 in an exfoliated form. Herein, the aspect ratio refers to a ratio of the longest distance (e.g., longest length) of the sheet shape relative to a thickness of the nanoclay particle (single clay sheet). In an embodiment, the nanoclay particle may have an average longest length of about 50 nanometers (nm) to about 10 micrometers (μm), or about 50 nm to about 5 μm, for example, about 50 nm to about 1 μm, and an average thickness of about 1 nm to about 10 μm. The clay particle may have a layered structure including at least one sheet.

The nanoclay may include an organic modified nanoclay, in which a cation on a surface of the nanoclay is substituted with an organic compound. For example, the nanoclay includes a compound including a hydrocarbyl group linked to a heteroatom (N, O, P, or S), and thus is lipophilic (e.g., hydrophobic). The organic compound may be represented by Chemical Formula 2 and may be a quaternary ammonium salt including a C3 to C40 substituted or unsubstituted aliphatic hydrocarbon group:

$$NTR_3^+A^-$$ [Chemical Formula 2]

wherein, in Chemical Formula 2, R is hydrogen, a C1 to C30 substituted or unsubstituted alkyl group or a C6 to C30 aryl group, T is a C3 to C40 substituted or unsubstituted aliphatic or aromatic hydrocarbon group, and $A^-$ is a halide anion.

The substituted or unsubstituted aliphatic hydrocarbon group may be methyl, ethyl, propyl, benzyl, hydroxyethyl, or a combination thereof.

The nanoclay may include a nanoclay that does not have a surface that is substituted with an organic compound. The nanoclay may be synthesized by a known method and may be commercially available.

An X-ray diffraction pattern of the composite may not have a peak in a range of about 2 degrees 2θ to about 10 degrees 2θ. An X-ray diffraction pattern of the composite may not have a peak in a range of about 25 degrees 2θ to about 32 degrees 2θ. An X-ray diffraction pattern of the composite may have a peak corresponding to the liquid crystal polymer (LCP) in a range of about 18 degrees 2θ to about 21 degrees 2θ.

The composite may include a polymerization product of a mixture including the nanoclay and a monomer of the thermotropic liquid crystal polymer. Accordingly, the composite according to an embodiment may show improved barrier properties (e.g., moisture transmission resistivity) along with remarkably improved impact strength, for example after the molding. Accordingly, without including a metal layer (e.g., an aluminum layer), a battery casing including the disclosed composite based on a plastic material (e.g., a thermotropic liquid crystal polymer), may show improved mechanical properties and moisture transmission resistivity as well as a greatly reduced weight compared with a conventional battery casing based on a metal material.

The aforementioned thermotropic liquid crystal polymer includes a product which is polymerized in the presence of the nanoclay, and the polymerized product includes a main chain having a flexible unit together with a mesogen structure that includes a rigid benzene ring. Without being bound by any theory, when the polymerization is performed in the presence of the nanoclay, a hydroxy group that may be present on a surface of the nanoclay may react with the monomer(s) for the aforementioned thermotropic liquid crystal polymer. In addition, the monomers (and/or oligomer) for the above thermotropic liquid crystal polymer may easily permeate between the layers of the nanoclay, and thereby, the exfoliated nanoclay may be aligned along the main chain of the thermotropic liquid crystal polymer. Therefore, in the composite of the embodiment, the dispersability of the sheet-like exfoliated nanoclay may be considerably improved, and thus the composite according to the embodiment shows substantially no intrinsic peak for the nanoclay in its X-ray diffraction spectrum. In addition, a molded article prepared from the composite may show improved barrier properties (e.g., improved moisture transmission resistivity) and simultaneously improved impact characteristics at the same time.

The composite may be produced by polymerization of the monomers for the thermotropic liquid crystal polymer in the presence of the nanoclay. Accordingly, in another embodiment, a composition for producing the composite includes a monomer or oligomer for the thermotropic liquid crystal polymer and the nanoclay. By a polymerization of such a composition, the composite is produced and subsequently molded to obtain a molded article including the composite. The molded article may be a battery casing.

The monomer or the oligomer for the thermotropic liquid crystal polymer may include a substituted or unsubstituted p-hydroxybenzoic acid (HBA), a HBA oligomer having a polymerization degree of about 2 to about 5, an aromatic hydroxycarboxylic acid having no parahydroxybenzoic acid moiety, a polymer including the repeating unit represented by the aforementioned Chemical Formula 1 (e.g., a polyalkylene terephthalate moiety, a polyalkylene isophthalate moiety, polyalkylene naphthalate moiety, or combination thereof), an aromatic dicarboxylic acid, an aromatic diol, or a combination thereof. The aromatic dicarboxylic acid and the aromatic diol may provide the aforementioned aromatic dicarbonyl repeating unit and the aforementioned aromatic dioxy repeating unit in the thermotropic liquid crystal polymer. An amount of each monomer or oligomer may be controlled so as to provide the liquid crystal polymer having the aforementioned composition.

Details (types, amounts, etc.) of the nanoclay included in the composition are the same as described above. The composition may further include an appropriate solvent for the polymerization (e.g., acetic anhydride) and/or a catalyst that will be described later.

The polymer including the repeating unit represented by the foregoing Chemical Formula 1 (e.g., polyethylene terephthalate) may have an intrinsic viscosity of greater than or equal to about 0.1 deciliters per g (dl/g), for example, greater than or equal to about 0.2 dl/g, greater than or equal to about 0.3 dl/g, greater than or equal to about 0.4 dl/g, greater than or equal to about 0.5 dl/g, greater than or equal to about 0.6 dl/g, greater than or equal to about 0.7 dl/g, greater than or equal to about 0.75 dl/g, greater than or equal to about 0.8 dl/g and less than or equal to about 2 dl/g, for example, less than or equal to about 1.5 dl/g, or less than or equal to about 1 dl/g, but is not limited thereto.

A polymerization method is not particularly limited and may be appropriately selected. In an embodiment, a mixture including a monomer or an oligomer for a thermotropic liquid crystal polymer and the nanoclay is heated up to a predetermined temperature (e.g., a temperature of greater than or equal to about 100° C., for example, greater than or equal to about 130° C., greater than or equal to about 150° C., greater than or equal to about 180° C., or greater than or equal to about 200° C.) to form a melt solution, and reacting the reactants at an appropriate reaction temperature to form a melt polymer. When a block copolymer is prepared using a HBA oligomer, monomers other than the HBA oligomer are heated at a predetermined temperature to form a melt solution, the HBA oligomer is added at a predetermined temperature (e.g., greater than or equal to about 200° C.), a catalyst (to be described later) is added as needed and the resultant mixture is heated at a reaction temperature again. The reaction temperature is not particularly limited and may be appropriately selected. For example, the reaction temperature may be greater than or equal to about 200° C., greater than or equal to about 230° C., greater than or equal to about 250° C., greater than or equal to about 270° C., or greater than or equal to about 300° C.

A vacuum may be applied so that a volatile (e.g., acetic acid, water, etc.) produced at a final process of the condensation polymerization may be easily removed. During the reaction, a catalyst may be used as needed. Examples of the catalyst may include an organic tin compound such as dialkyl tin oxide (e.g., dibutyl tin oxide), or diaryl tin oxide; an organic titanium compound or inorganic titanium materials, such as, for example, titanium dioxide, alkoxy titanium silicate, or titanium alkoxide; antimony trioxide; an alkali or an alkaline-earth metal salt of carboxylic acid (e.g., potassium acetate); an inorganic acid salt (e.g., potassium sulfate); a Lewis acid (e.g., boron trifluoride); a gas-phased acid catalyst such as halogenated hydrogen (e.g., hydrogen chloride), but is not limited thereto. An amount of the catalyst may be about 1 part per million (ppm) to about 1,000 ppm, for example about 2 ppm to about 100 ppm, per a total amount of monomers. In a melt state, after extraction from a polymerization reaction bath, the polymerization product may be processed into a pellet, a flake, or a powder shape.

At least one of the bottom wall and the plurality of side walls including the composite may include a molded article of the composite. A method of producing the molded article is not particularly limited and may be appropriately selected. The molded article may be produced by obtaining a pellet including the composite and molding the same in a desirable shape through an extrusion molding machine or an injection molding machine. A type of the extrusion molding machine and the injection molding machine is not particularly limited. The extrusion molding machine or injection molding machine is commercially available.

As described above, a casing for a cell-module integrated lithium battery desirably has improved strength and low moisture transmission. The casing having the side walls and/or the bottom wall including the composite, or the molded article thereof, may exhibit reduced moisture transmission resistivity while maintaining improved impact strength.

Therefore, the molded article obtained from the composite may have an unnotched Izod impact strength, as measured according to ASTM D256, of greater than or equal to about 20 kilojoules per square meter ($kJ/m^2$), greater than or equal to about 21 $kJ/m^2$, greater than or equal to about 22 $kJ/m^2$, greater than or equal to about 23 $kJ/m^2$, greater than or equal to about 30 $kJ/m^2$, greater than or equal to about 35 $kJ/m^2$, greater than or equal to about 36 $kJ/m^2$, greater than or equal to about 37 $kJ/m^2$, or greater than or equal to about 38 $kJ/m^2$. The molded article obtained from the composite may exhibit an unnotched Izod impact strength of greater than or equal to about 50 $kJ/m^2$. The molded article may have water vapor transmittance rate (WVTR) of less than or equal to about 0.05 grams per square meter per day ($g/m^2$ day), for example, less than or equal to about 0.049 $g/m^2$ day, less than or equal to about 0.048 $g/m^2$ day, or less than or equal to about 0.047 $g/m^2$ day, as measured at 38° C. and a relative humidity of 100% according to ISO 15106 or ASTM F 1249.

In addition, the composite may exhibit improved moldability. In an embodiment, the molded article produced from the composite of the embodiments may not have an appearance defect caused by a loss of the composite from a mold inlet during injection molding.

In another embodiment, a battery (or a battery module, hereinafter, referred to as a battery) includes the battery casing. The battery or battery module includes at least one electrode assembly housed in the container of the battery casing. The battery may have a modular shape and comprises a plurality of electrode assemblies. The battery casing is the same as described above. The electrode assembly includes a positive electrode, a negative electrode, and a separator disposed therebetween. The electrode assembly may further include, for example an aqueous or non-aqueous electrolyte solution in the separator. The type of the electrode assembly is not particularly limited. In an embodiment, the electrode assembly may include an electrode assembly for a rechargeable lithium battery. The positive electrode, the negative electrode, the separator, and the electrolyte solution of the electrode assembly may be appropriately selected according to the type of the electrode and are not particularly limited. Hereinafter, the electrode assembly for a rechargeable lithium battery is exemplified but the present disclosure is not limited thereto.

The positive electrode may include, for example, a positive active material disposed on a positive current collector and may further include at least one of a conductive material and a binder. The positive electrode may further include a filler. The negative electrode may include, for example a negative active material disposed on a negative current collector and may further include at least one of a conductive material and a binder. The negative electrode may further include a filler.

The positive active material may include, for example a (solid solution) oxide including lithium but is not particularly limited as long as it is a material capable of intercalating and deintercalating lithium ions electrochemically. The positive active material may be a layered compound such as, for example, lithium cobalt oxide ($LiCoO_2$) or lithium nickel oxide ($LiNiO_2$), a compound substituted with one or more transition metal; a lithium manganese oxide such as $Li_{1+x}Mn_{2-x}O_4$ (wherein, x is 0 to 0.33), $Li_2MnO_3$, $LiMn_2O_3$, or $LiMnO_2$; lithium copper oxide ($Li_2CuO_2$), $LiFe_3O_4$; vanadium oxide, such as, for example, $LiV_3O_8$, $V_2O_5$, or $Cu_2V_2O_7$; a Ni rich-type lithium nickel oxide represented by chemical formula $LiNi_{1-x}M_xO_2$ (wherein, M is at least one of Co, Mn, Al, Cu, Fe, Mg, B, or Ga and x is 0.01 to 0.3); a lithium manganese composite oxide represented by chemical formula $LiMn_{2-x}M_xO_2$ (wherein, M is at least one of Co, Ni, Fe, Cr, Zn, or Ta and x is 0.01 to 0.1) or $Li_2Mn_3MO_8$ (wherein, M is at least one of Fe, Co, Ni, Cu, or Zn); $LiMn_2O_4$ where a portion of Li in the chemical formula is substituted with an alkaline-earth metal ion; a disulfide compound; or $Fe_2(MoO_4)_3$, but is not limited thereto.

Examples of the conductive material may include carbon black such as ketjen black, acetylene black, and the like, natural graphite, artificial graphite, or a combination thereof, but is not particularly limited as long as it increases the electrical conductivity of the positive electrode.

The binder may be for example, polyvinylidene fluoride, an ethylene-propylene-diene terpolymer, a styrene-butadiene rubber, an acrylonitrile-butadiene rubber, a fluorine rubber, polyvinylacetate, polymethylmethacrylate, polyethylene, nitrocellulose, or a combination thereof, but is not particularly limited as long as it facilitates the binding of the (positive or negative) active material and the conductive material to the current collector. Examples of the binder may be polyvinyl alcohol, carboxylmethyl cellulose (CMC), starch, hydroxypropyl cellulose, recycled cellulose, polytetrafluoroethylene, polyethylene, polypropylene, an ethylene-propylene-diene polymer (EPDM), sulfonated EPDM, a styrene butylene rubber, a fluorine rubber, various copolymers thereof, polymeric highly saponified polyvinyl alcohol, or a combination thereof.

The negative active material may be for example, a carbon and/or graphite materials such as natural graphite, artificial graphite, expanded graphite, carbon fiber, non-graphitizable carbon, carbon black, carbon nanotube, fullerene, activated carbon, or a combination thereof; a metal or metalloid, such as, for example, Al, Si, Sn, Ag, Bi, Mg, Zn, In, Ge, Pb, Pd, Pt, Ti, or a combination thereof that may form an alloy with lithium and a compound including such an element; a composite of a metal or metalloid, or a compound including the metal or metalloid, and a carbon or graphite material; a lithium-containing nitride; or a combination thereof. Among them, a carbon-based active material, a silicon-based active material, a tin-based active material, or a silicon-carbon-based active material may be used. A combination comprising at least one of the foregoing may also be used.

The separator is not particularly limited and may be any type of separator suitable for use in a rechargeable lithium battery. For example, a porous film or non-woven fabric having excellent high rate discharge performance may be used alone or in a combination thereof. The separator may include a pore and the pore may have a diameter of about 0.01 μm to about 10 μm. A thickness of the separator may be about 5 μm to about 300 μm. A substrate of the separator may include, for example, a polyolefin-based resin, a polyester-based resin, polyvinylidene fluoride (PVDF), a vinylidene fluoride-hexafluoropropylene copolymer, a vinylidene fluoride-perfluorovinylether copolymer, a vinylidene fluoride-tetrafluoroethylene copolymer, a vinylidene fluoride-trifluoroethylene copolymer, a vinylidene fluoride-fluoroethylene copolymer, a vinylidene fluoride-hexafluoroacetone copolymer, a vinylidene fluoride-ethylene copolymer, a vinylidene fluoride-propylene copolymer, a vinylidene fluoride-trifluoropropylene copolymer, a vinylidene fluoride-tetrafluoroethylene-hexafluoropropylene copolymer, a vinylidene fluoride-ethylene-tetrafluoroethylene copolymer, or a combination thereof. When the electrolyte is a solid electrolyte such as a polymer, the solid electrolyte may function as a separator.

The conductive material improves the conductivity of an active material and may be included in an amount of about 1 weight percent (wt %) to about 30 wt % based on a total weight of the electrode, but is not limited thereto. Such a conductive material is not particularly limited as long as it does not cause a chemical change in a battery and has electrical conductivity, and may be, for example, graphite such as natural graphite or artificial graphite; carbon black such as acetylene black, ketjen black, channel black, furnace black, lamp black, or thermoblack; a carbon derivative such as carbon nanotube, or fullerene, a conductive fiber such as a carbon fiber or a metal fiber; carbon fluoride, a metal powder such as aluminum, or a nickel powder; a conductive whisker such as zinc oxide, or potassium titanate; a conductive metal oxide such as a titanium oxide; a conductive polymer such as a polyphenylene derivative; or a combination thereof.

The filler is an auxiliary component to suppress expansion of an electrode, and is not particularly limited as long as it does not cause a chemical change in a battery and is a fiber-shaped material. For example, the filler may be an olefin-based polymer such as polyethylene, or polypropylene; a fiber-shaped material such as a glass fiber, or a carbon fiber; or a combination thereof.

In the electrode, the current collector may be a site where electron transport occurs in an electrochemical reaction of the active material. The current collector may be a negative current collector or a positive current collector, and varies according to the type of the electrode. The negative current collector may have a thickness of about 3 μm to about 500 μm. The negative current collector is not particularly limited as long as it does not cause a chemical change in a battery and has electrically conductivity and may be, for example, copper, stainless steel, aluminum, nickel, titanium, fired carbon, copper or stainless steel that is surface-treated with carbon, nickel, titanium, silver, or the like, an aluminum-cadmium alloy, or a combination thereof.

The positive current collector may have a thickness of about 3 μm to about 500 μm, but is not limited thereto. The positive current collector is not particularly limited as long as it does not cause a chemical change in a battery and has high electrically conductivity. The positive current collector may be, for example, stainless steel, aluminum, nickel, titanium, fired carbon, or aluminum or stainless steel that is surface-treated with carbon, nickel, titanium, silver, or a combination thereof.

The positive and/or negative current collector may have a fine concavo-convex shape on its surface to reinforce a binding of the active material and may have at least one of various shapes of a film, a sheet, a foil, a net, a porous film, a foam, or a non-woven fabric.

The lithium-containing non-aqueous electrolyte solution may consist of a non-aqueous electrolyte and a lithium salt.

The non-aqueous electrolyte may be, for example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, an ether, methyl propionate, ethyl propionate, or a combination thereof.

The lithium salt is dissolved in the non-aqueous electrolyte solution and may be, for example, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, LiBCl4, a C1-C10 aliphatic lithium carboxylate, lithium tetrakis(pentafluorophenyl)borate, lithium imide, lithium tetraphenyl borate, or a combination thereof.

An organic solid electrolyte, an inorganic solid electrolyte, and the like may be used as needed.

The organic solid electrolyte may be, for example, polyethylene derivative, a polyethylene oxide derivative, a polypropylene oxide derivative, a phosphoric acid ester polymer, poly-I-lysine, polyester sulfide, polyvinyl alcohol, polyvinylidene fluoride, a polymer including an ionic leaving group, or a combination thereof.

The inorganic solid electrolyte may be, for example, a nitride of Li, a lithium halide, a lithium sulfate, or a combination thereof, such as, for example, Li$_3$N, LiI, Li$_5$NI$_2$, Li$_3$N—LiI—LiOH, LiSiO$_4$—LiI—LiOH, and other lithium related compound, such as, for example, Li$_2$SiS$_3$, LiSiO$_4$, Li$_4$SiO$_4$, Li$_4$SiO$_4$—LiI—LiOH, Li$_3$PO$_4$—Li$_2$S—SiS$_2$, and the like.

The non-aqueous electrolyte solution may include, for example, pyridine, triethylphosphite, triethanolamine, cyclic ether, ethylene diamine, n-glyme, hexa phosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, or a combination thereof, in order to improve charge and discharge characteristics, flame retardancy, and the like. As desired, in order to provide flame retardancy, a halogen-containing solvent such as carbon tetrachloride, ethylene trifluoride, and the like may be further added. In order to improve high temperature storage characteristics, carbon dioxide gas may be further added.

The composite according to an embodiment exhibits improved properties (e.g., high moisture transmission resistivity) as compared to a conventional resin for injection molding, and therefore the external assembly of unit cells may be omitted during manufacture of a cell/module integrated battery. Therefore, the integrated battery cell/module according to an embodiment may have reduced components and may be manufactured by a simplified process. In an embodiment, a battery (or a battery module) including the battery casing may be manufactured by a simplified manner as compared to a conventional battery or battery module. For example, a battery/battery module including the battery casing may be manufactured by preparing the battery casing including, for example, at least two spaces (hereinafter, referred to as an electrode assembly container) for housing an electrode assembly by molding the composite, disposing the electrode assembly in the electrode assembly container, and injecting an electrolyte solution in the electrode assembly container including the electrode assembly. The composite may be molded by any molding machine and molding method.

Hereinafter, specific examples are illustrated. However, these examples are exemplary, and the present disclosure is not limited thereto.

[Measuring Method]

[1] X-ray Diffraction Spectrum

X-ray diffraction spectroscopy is performed by using Bruker (D8 Advance). CuKα radiation (λ of 1.542 angstrom) is as a target, and a measurement range is a diffraction angle of=2 to 60° 2θ.

[2] Water vapor transmittance rate (WVTR): WVTR is measured using Aquatran (Mocon Inc.) at 38° C. and a relative humidity of 100%, and in accordance with ISO 15106, or ASTM F1249.

[3] Tensile strength: Tensile strength is measured using Cometech (QC-506BA) in accordance with ASTM D638, at a tensile speed of 50 mm/min.

[4] Impact strength: Un-notched type Izod impact strength is measured using Instron (impactor II, CEAST 9050) in accordance with ASTM D256.

[5] Transmission Electron Microscope Analysis

A transmission electron microscope analysis is performed by using tem-Tecnai G2 made by FEI Company.

EXAMPLES

Example 1

An oligomer of 4-hydroxybenzoic acid (HBA) having a degree of polymerization (DP) of 3.4, terephthalic acid (TPA), hydroquinone (HQ), 4,4'-bisphenol (BP), polyethylene terephthalate (PET, IV/0.80, COOH/max 35 meg/kg, MP/253° C., Manufacturer: Samyang Corp, Tradename: BB), nanoclay (Cloisite 30B, Rockwood Clay Additives GmbH), and acetic anhydride in each content shown in Table 1 are put in a 200 ml glass reactor equipped with a torque meter, a thermometer, and a reflux condenser to obtain a reaction mixture. Herein, the nanoclay is surface treated with a quaternary ammonium salt having the following chemical formula.

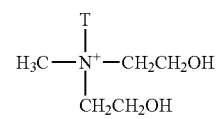

In the above structure, T is a C3 to C40 substituted or unsubstituted aliphatic or aromatic hydrocarbon group.

Figure 3A:
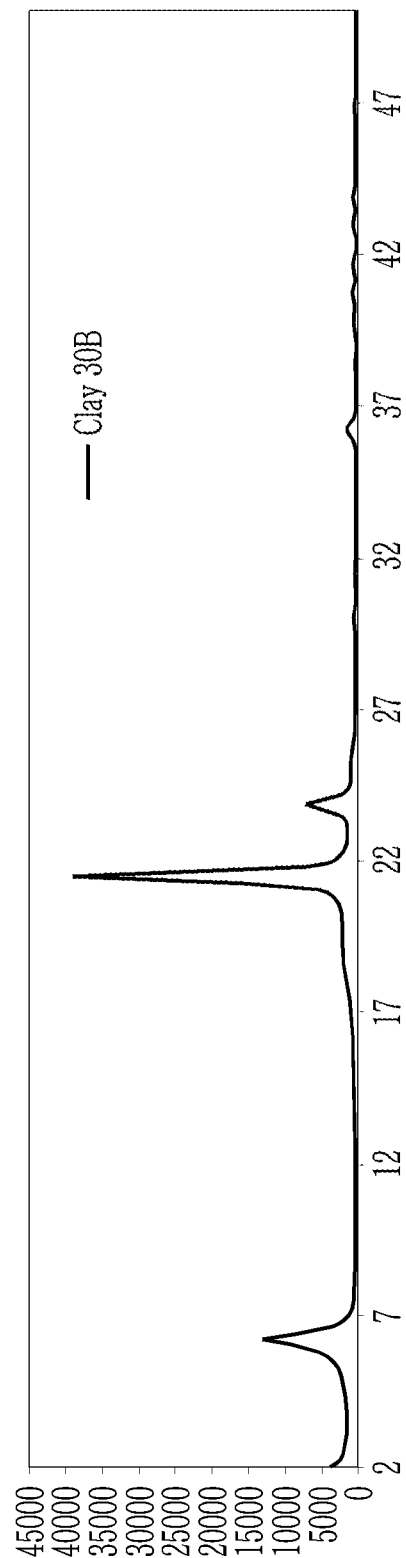
FIG. 3A is a graph of intensity (arbitrary units, a.u.) versus diffraction angle (degrees 2-theta), which shows an X-ray diffraction spectrum of the nanoclay included in the nanoclay-polymer composite according to Example 1.

An X-ray diffraction analysis regarding the nanoclay is performed, and the results are shown in FIG. 3A.

The reactor is assembled, and the reaction mixture is heated up to 140° C. at 150 rpm to obtain a melting solution of the reaction mixture. The reflux condenser is replaced with a dean-stark condenser, and 50 mg of TiOBu$_4$ is added to the melting solution while a temperature of the melting solution is increased. The melting solution is heated up to 330° C., and an internal pressure of the reactor is slowly reduced down to 10 torr. When the internal pressure of the reactor reaches 10 torr, and when an agitation torque becomes around 0.4 ampere, the agitation is stopped to recover a polymerization product.

The polymerization product is ground, extruded, and injected to prepare a specimen for measuring properties. The extrusion is performed by using a Hakke polylab single-screw extruder in the following method:

The polymerization product is put in the extruder (the single-screw extruder) and melt at a predetermined processing temperature (about 280° C.) and a screw speed (about 40 rpm) and then, solidified to obtain a pellet-shaped extrudate.

The injection is performed under the following condition by using a Thermo scientific Haake minijet II.

During the injection, the polymerization product pellets are filled in a cylinder and maintained at 320° C. for about 3 minutes and thus sufficiently melted. The obtained melt is sufficiently filled in the cylinder by pressing it with an injection bar and then, loaded in a mold (a mold temperature: 100° C.) with the minijet. The loaded melt is pressed with a predetermined pressure (e.g., about 700 bar) to obtain a molded specimen. The injecting machine is used to obtain a specimen having a diameter of 35 mm and a thickness of 1.0 mm for measuring moisture transmission resistivity and a specimen having a size of length/width/thickness of 54 mm/12 mm/3.2 mm for measuring impact strength.

Figure 3B:
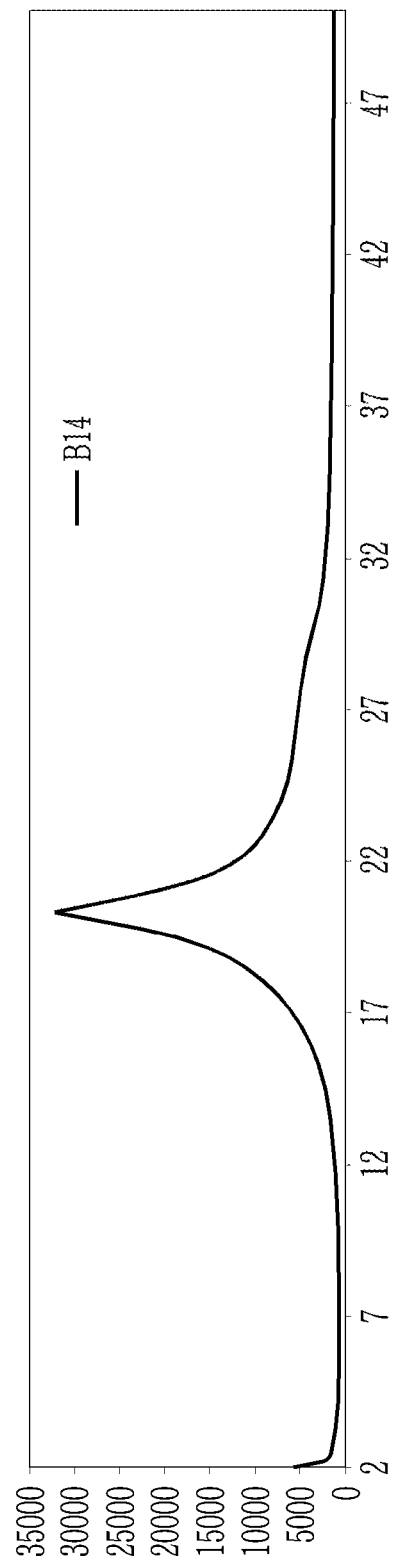
FIG. 3B is a graph of intensity (arbitrary units, a.u.) versus diffraction angle (degrees 2-theta), which shows an X-ray diffraction spectrum of the polymer according to Comparative Example 1-1.
Figure 3C:
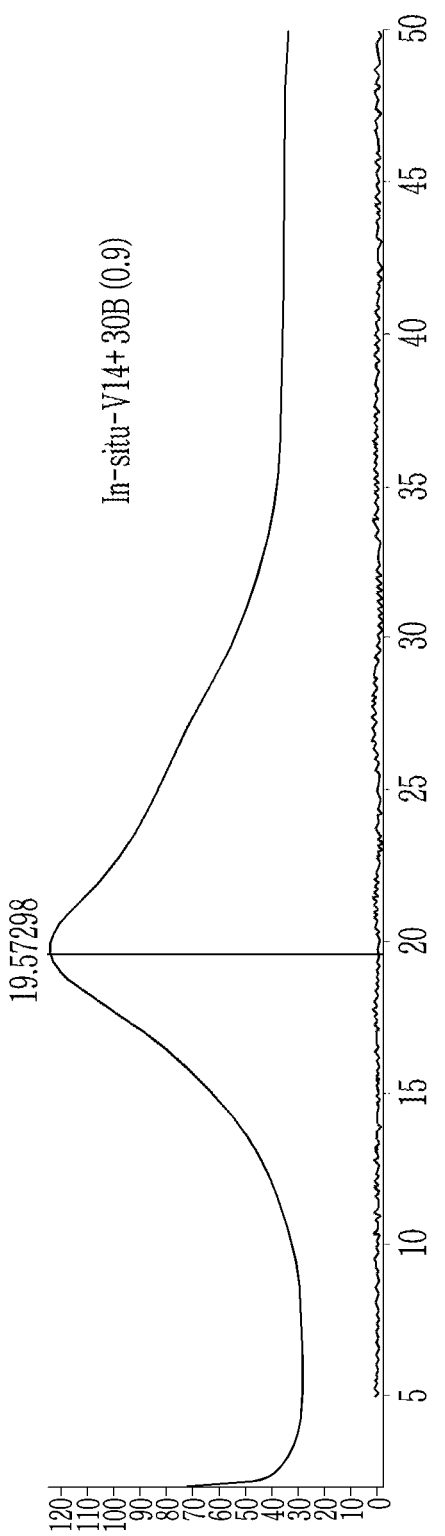
FIG. 3C is a graph of intensity (a.u.) versus diffraction angle (degrees 2-theta), which shows an X-ray diffraction spectrum of the nanoclay-polymer composite according to Example 1.

An X-ray diffraction analysis of the obtained polymerization product is performed, and the results are shown in FIG. 3C and Table 2. Impact strength and moisture transmission resistivity of the specimens are measured, and the results are shown in Table 2.

Comparative Example 1-1

A polymerization product is made according to the same method as Example 1 except for using no nanoclay. The polymerization product is ground with a grinder and then, prepared into a specimen for measuring properties according to the same method as Example 1.

An X-ray diffraction analysis of the polymerization product is performed, and the result is shown in FIG. 3B. Impact strength and moisture transmission resistivity of the specimen are measured, and the results are shown in Table 2.

Comparative Example 1-2

A composite and a composite specimen are obtained by inputting the polymerization product according to Comparative Example 1-1 and nanoclay (Cloisite 30B, Rockwood Clay Additives GmbH) and extruding the mixture according to the same method as Example 1 and subsequently injecting it.

An X-ray diffraction analysis of the composite is performed, and the result is shown in FIG. 3D. Impact strength and moisture transmission resistivity of the specimen are measured, and the results are shown in Table 2.

Referring to the results of FIGS. 3A, 3B, and 3C and Table 2, an X-ray diffraction pattern of the polymerization product according to Example 1 shows not an intrinsic nanoclay peak but only a liquid crystal polymer peak. This result shows that nanoclays are peeled off without an actual agglomeration and dispersed in the liquid crystal polymer.

Referring to the result of FIG. 3D, an X-ray diffraction pattern of the composite obtained through blending shows an intrinsic nanoclay peak.

Example 2

A polymerization product is manufactured according to the same method as Example 1 except for using 4-hydroxybenzoic acid (HBA), 2-hydroxy-6-naphthoic acid (HNA), and polyethylene terephthalate (PET, IV/0.80, COOH/max 35 meg/kg, MP/253° C., Manufacturer: Samyang Corp. Trade name: BB) as a monomer for a liquid crystal polymer as shown in Table 1 and nanoclay (Cloisite 20A, Rockwood Clay Additives GmbH) in an amount shown in Table 1. Herein, the nanoclay is surface treated with a quaternary ammonium salt having the following chemical formula.

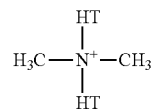

In the above structure, HT means "hydrogenated T", wherein "T" is the same as in Example 1.

Figure 4A:
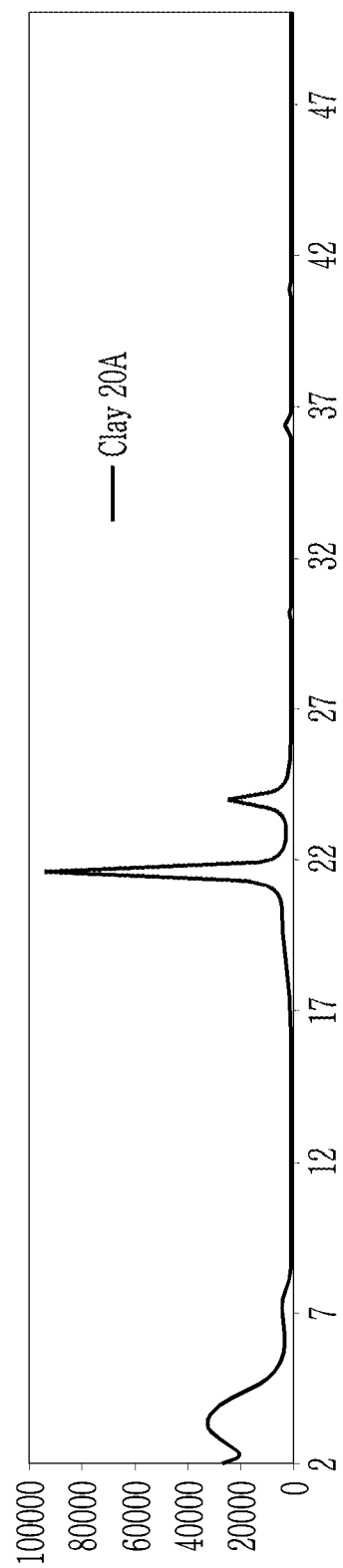
FIG. 4A is a graph of intensity (a.u.) versus diffraction angle (degrees 2-theta), which shows an X-ray diffraction spectrum of the nanoclay included in the nanoclay-polymer composite according to Example 2.

An X-ray diffraction of nanoclay is analyzed, and the result is shown in FIG. 4A.

A polymerization product is ground with a grinder and prepared into a specimen for measuring properties according to the same method as Example 1.

Figure 4B:
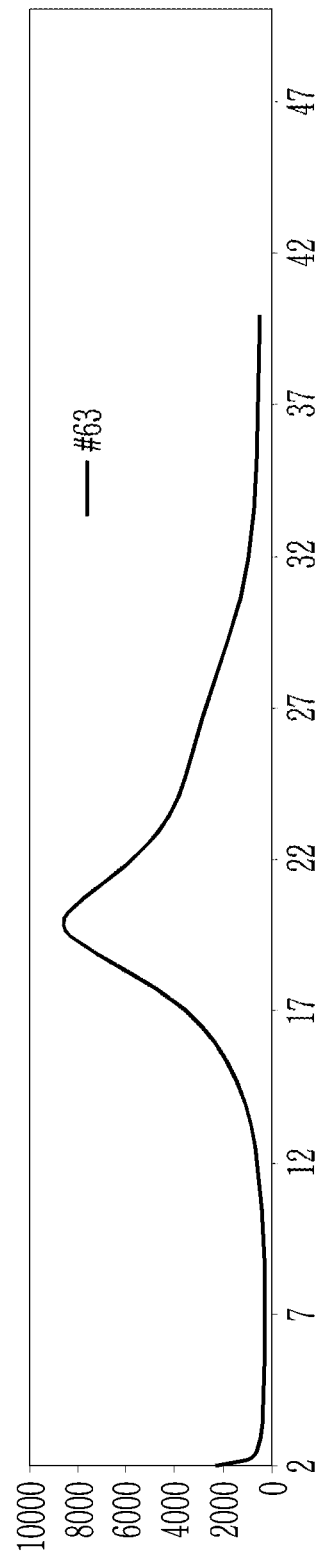
FIG. 4B is a graph of intensity (a.u.) versus diffraction angle (degrees 2-theta), which shows an X-ray diffraction spectrum of the polymer according to Comparative Example 2-1.
Figure 4C:
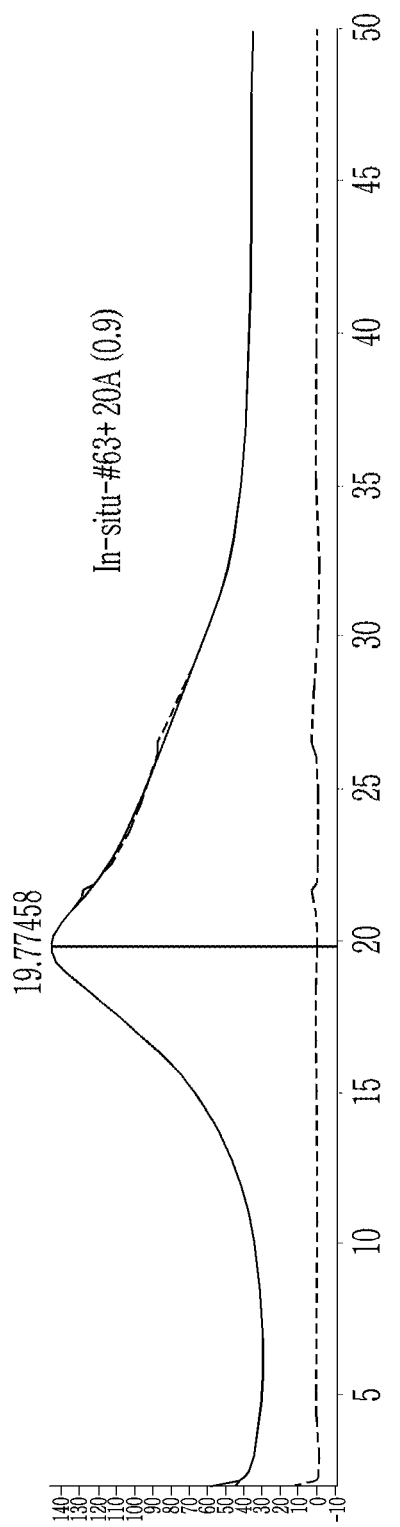
FIG. 4C is a graph of intensity (a.u.) versus diffraction angle (degrees 2-theta), which shows an X-ray diffraction spectrum of the nanoclay-polymer composite according to Example 2.

An X-ray diffraction analysis of the polymerization product is performed, and the result is shown in FIG. 4C. Impact strength and moisture transmission resistivity of the specimen are measured, and the results are shown in Table 2.

Comparative Example 2-1

A polymerization product is prepared according to the same method as Example 2 except for using no nanoclay. The polymerization product is ground with a grinder and prepared into a specimen for measuring properties according to the same method as Example 1, except for the extrusion temperature of about 260° C./a screw speed of about 40 rpm; and an injection temperature of about 280° C./a screw speed of about 40 rpm.

An X-ray diffraction analysis of the polymerization product is performed, and the result is shown in FIG. 4B. Impact strength and moisture transmission resistivity of the specimen are measured, and the results are shown in Table 2.

Comparative Example 2-2

A composite and a composite specimen are obtained by extruding and injecting the polymerization product of Comparative Example 2-1 and nanoclay (Cloisite 20A, Rockwood Clay Additives GmbH) according to the same method as Comparative Example 2-1.

Figure 4D:
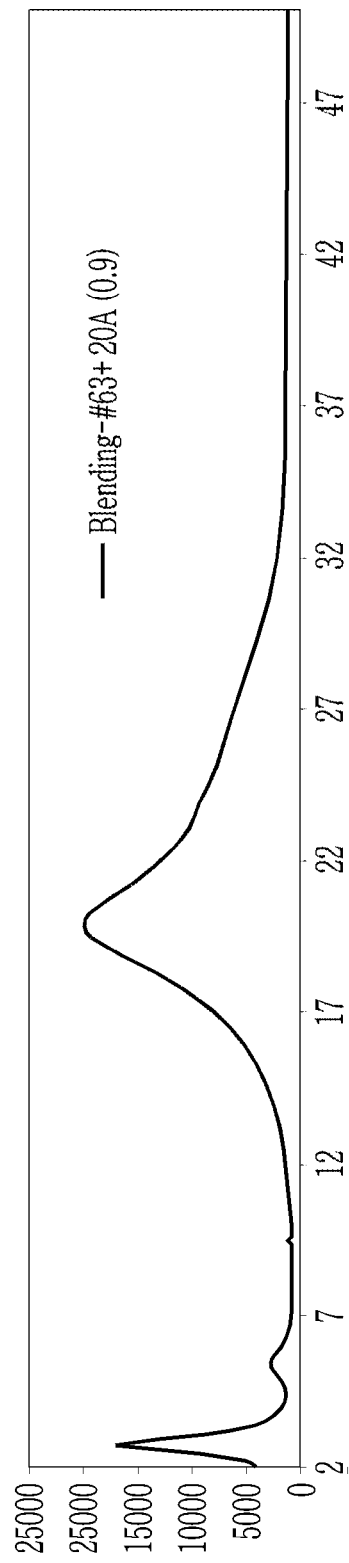
FIG. 4D is a graph of intensity (a.u.) versus diffraction angle (degrees 2-theta), which shows an X-ray diffraction spectrum of the nanoclay-polymer composite according to Comparative Example 2-2.

An X-ray diffraction analysis of the composite is performed, and the result is shown in FIG. 4D. Impact strength and moisture transmission resistivity of the specimen are measured, and the results are shown in Table 2.

Referring to the results of FIGS. 4A, 4B, and 4C and Table 2, an X-ray diffraction pattern of the polymerization product according to Example 2 does not show an intrinsic nanoclay peak but a liquid crystal polymer peak. This result implies that nanoclays are peeled off without an actual agglomeration but dispersed in a liquid crystal polymer.

Referring to the result of FIG. 4D, an X-ray diffraction pattern of the composite obtained through blending shows an intrinsic nanoclay peak.

Figure 7:
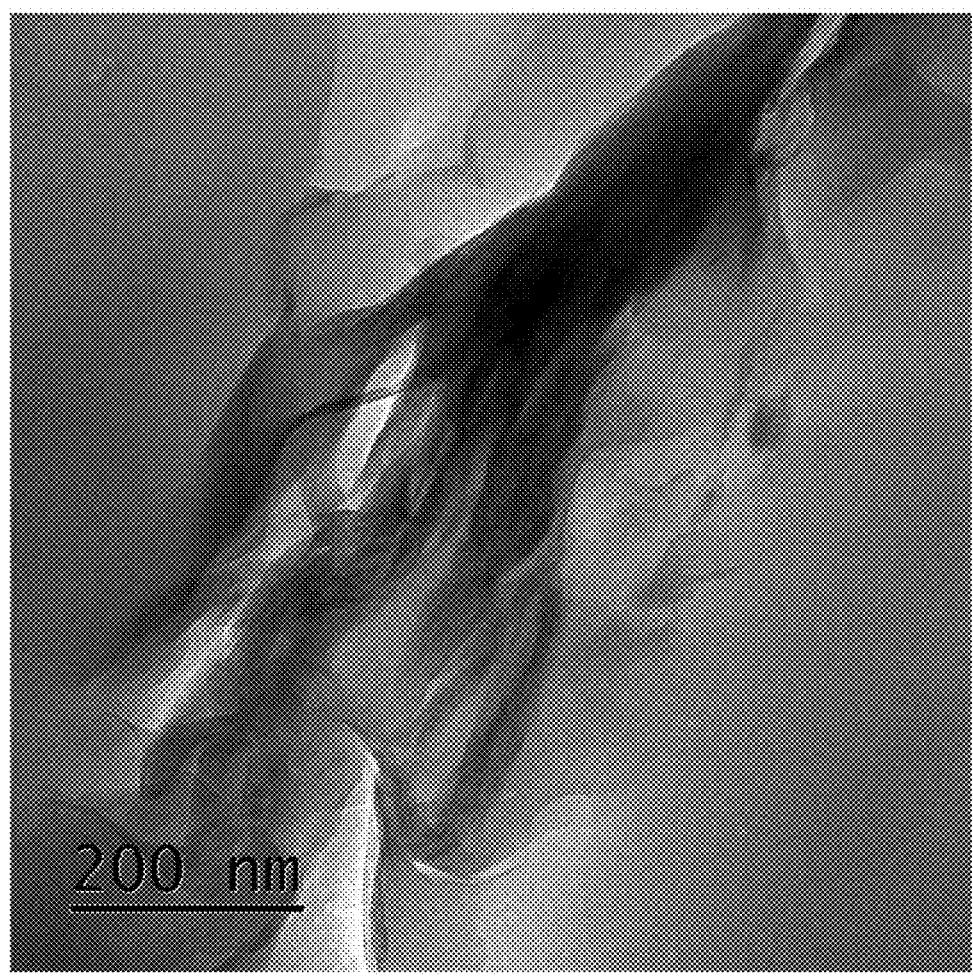
FIG. 7 is a TEM image of the nanoclay-polymer composite according to Comparative Example 2-2.
Figure 8:
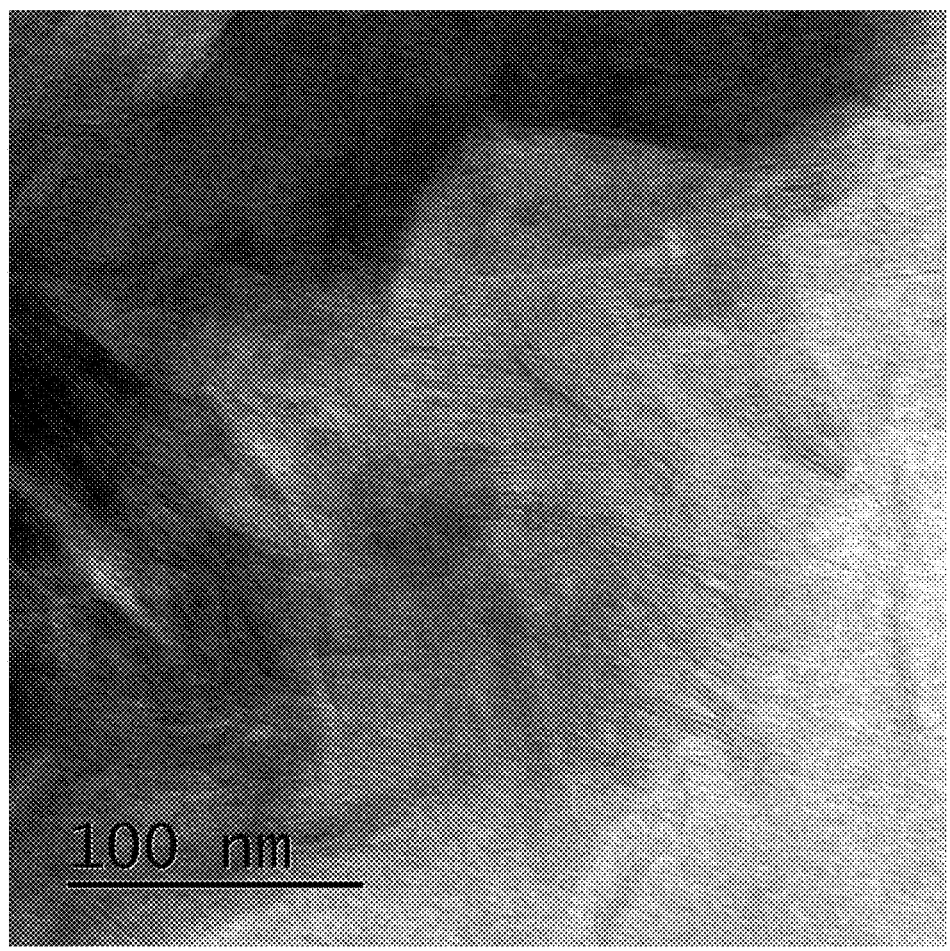
FIG. 8 is a TEM image of the nanoclay-polymer composite according to Example 2.

A transmission electron microscope analysis of the composites according to Comparative Example 2-2 and Example 2 is performed, and the results are shown in FIGS. 7 and 8. Referring to the results of FIGS. 7 and 8, nanoclays are better dispersed in the composite of Example 2 than in that of Comparative Example 2-2.

Comparative Example 2-3

A polymerization product is prepared according to the same method as Example 2 except for not using nanoclay and PET. The polymerization product is ground with a grinder and prepared into a specimen for measuring properties according to the same method as Example 2.

Impact strength and moisture transmission resistivity of the specimen are measured, and the results are shown in Table 2.

Example 3

A polymerization product is prepared according to the same method as Example 1 except for using 4-hydroxybenzoic acid (HBA), 2-hydroxy-6-naphthoic acid (HNA), and polyethylene terephthalate (PET, IV/0.80, COOH/max 35 meg/kg, MP/253° C., Manufacturer: Samyang Corp. Trade name: BB) as a monomer for a liquid crystal polymer as shown in Table 1 and nanoclay (Attapulgite, Fluorochem Ltd.) in a content shown in Table 1.

Figure 5A:
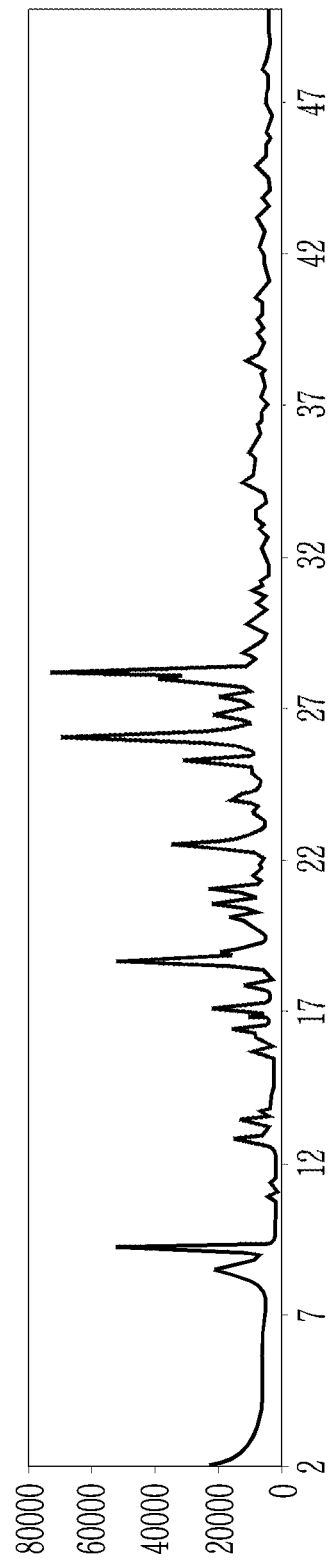
FIG. 5A is a graph of intensity (a.u.) versus diffraction angle (degrees 2-theta), which shows an X-ray diffraction spectrum of the nanoclay included in the nanoclay-polymer composite according to Example 3.

An X-ray diffraction analysis of the used nanoclay is performed, and the result is shown in FIG. 5A.

A polymerization product is ground with a grinder and prepared into a specimen for measuring properties according to the same method as Example 2.

Figure 5B:
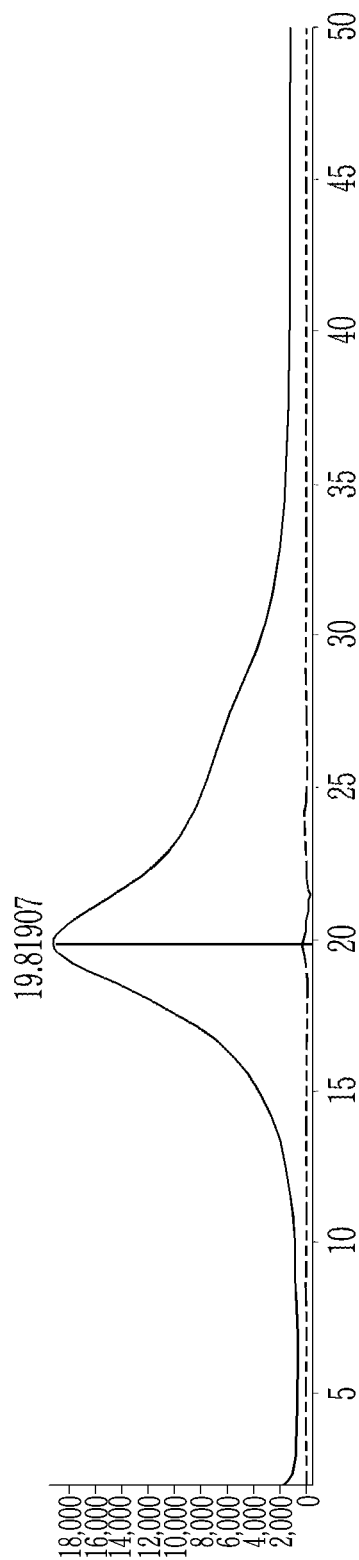
FIG. 5B is a graph of intensity (a.u.) versus diffraction angle (degrees 2-theta), which shows an X-ray diffraction spectrum of the nanoclay-polymer composite according to Example 3.

An X-ray diffraction analysis of the polymerization product is performed, and the result is shown in FIG. 5B. Impact strength of the specimen is measured, and the result is shown in Table 2.

Comparative Example 3

A composite and a composite specimen are obtained by extruding and injecting the polymerization product of Comparative Example 2-1 and nanoclay (Attapulgite, Fluorochem Ltd.) according to the same method as Comparative Example 2-1.

Figure 5C:
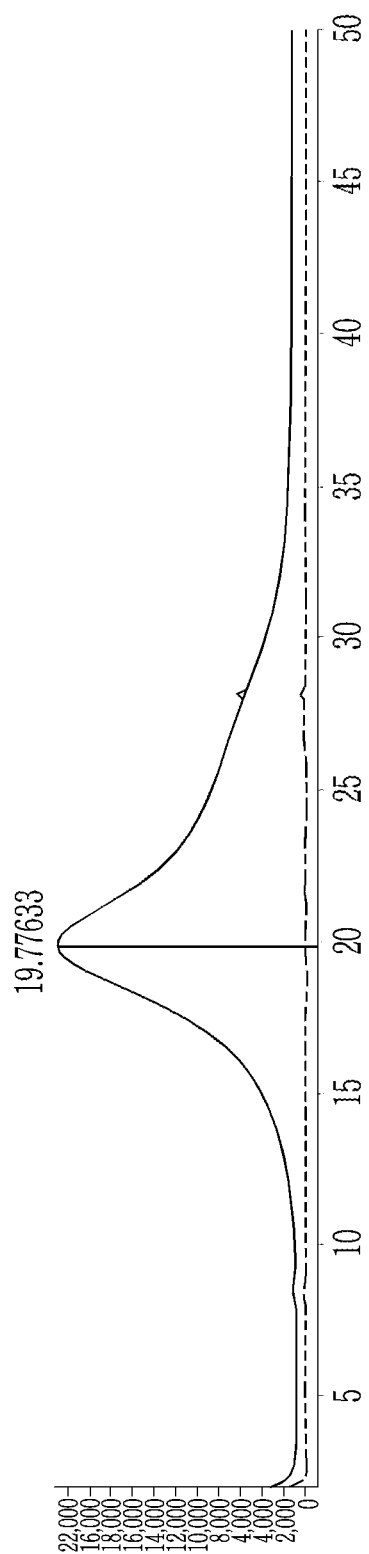
FIG. 5C is a graph of intensity (a.u.) versus diffraction angle (degrees 2-theta), which shows an X-ray diffraction spectrum of the nanoclay-polymer composite according to Comparative Example 3.

An X-ray diffraction analysis of the composite is performed, and the result is shown in FIG. 5C. Impact strength and moisture transmission resistivity of the specimen are measured, and the results are shown in Table 2.

Referring to the results of FIGS. 5A, 5B, and 5C and Table 2, an X-ray diffraction pattern of the polymerization product according to Example 3 shows not an intrinsic nanoclay peak but a liquid crystal polymer peak alone. This result implies that nanoclays are peeled off without an actual agglomeration but dispersed in a liquid crystal polymer.

Referring to the result of FIG. 5C, an X-ray diffraction pattern of the composite obtained by blending shows an intrinsic nanoclay peak.

Example 4

A polymerization product is made according to the same method as Example 1 except for using 4-hydroxybenzoic acid (HBA), 2-hydroxy-6-naphthoic acid (HNA), and polyethylene terephthalate (PET, IV/0.80, COOH/max 35 meg/kg, MP/253° C., Manufacturer: Samyang Corp. Trade name: BB) as a monomer for a liquid crystal polymer as shown in Table 1 and nanoclay (Laponite, Rockwood Clay Additives GmbH) in a content shown in Table 1.

Figure 6A:
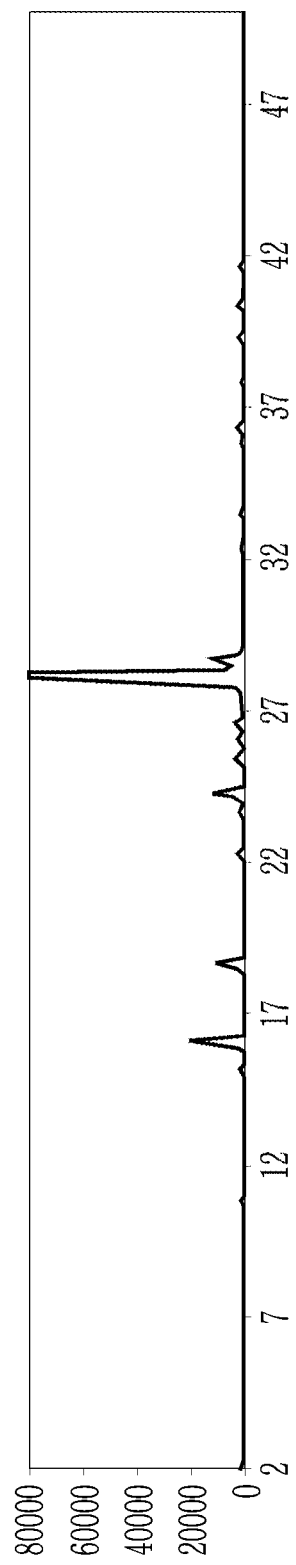
FIG. 6A is a graph of intensity (a.u.) versus diffraction angle (degrees 2-theta), which shows an X-ray diffraction spectrum of the nanoclay in the nanoclay-polymer composite according to Example 4.

An X-ray diffraction analysis of the used nanoclay is performed, and the results are shown in FIG. 6A.

The polymerization product is ground with a grinder and prepared into a specimen according to the same method as Example 2.

Figure 6B:
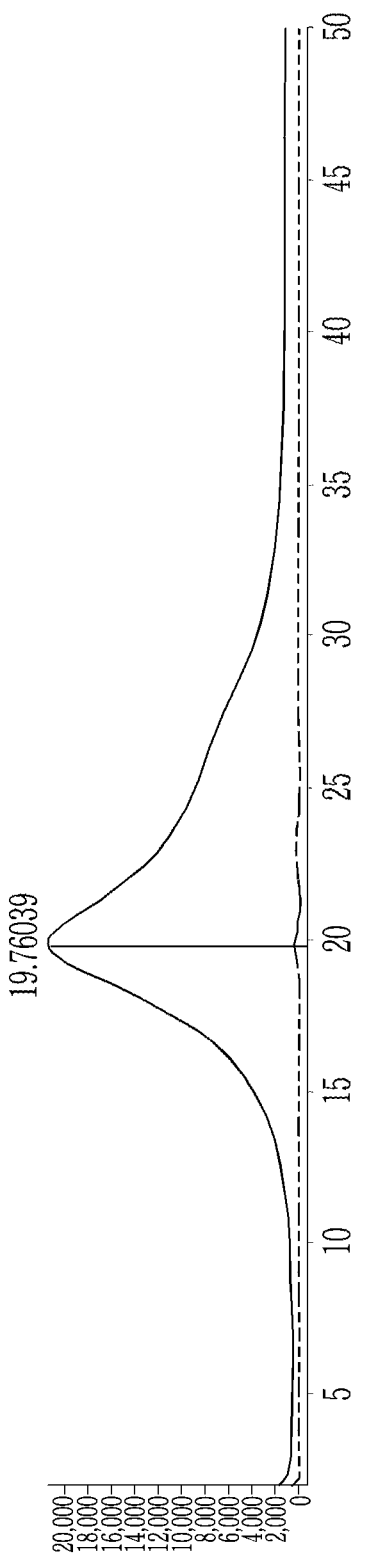
FIG. 6B is a graph of intensity (a.u.) versus diffraction angle (degrees 2-theta), which shows an X-ray diffraction spectrum of the nanoclay-polymer composite according to Example 4.

An X-ray diffraction analysis of the composite is performed, and the result is shown in FIG. 6B. Impact strength of the specimen is measured, and the result is shown in Table 2.

Comparative Example 4

The polymerization product of Comparative Example 2-1 and nanoclay (Laponite, Rockwood Clay Additives GmbH) are extruded and injected according to the same method as Comparative Example 2-1 to obtain a composite and a composite specimen.

Figure 6C:
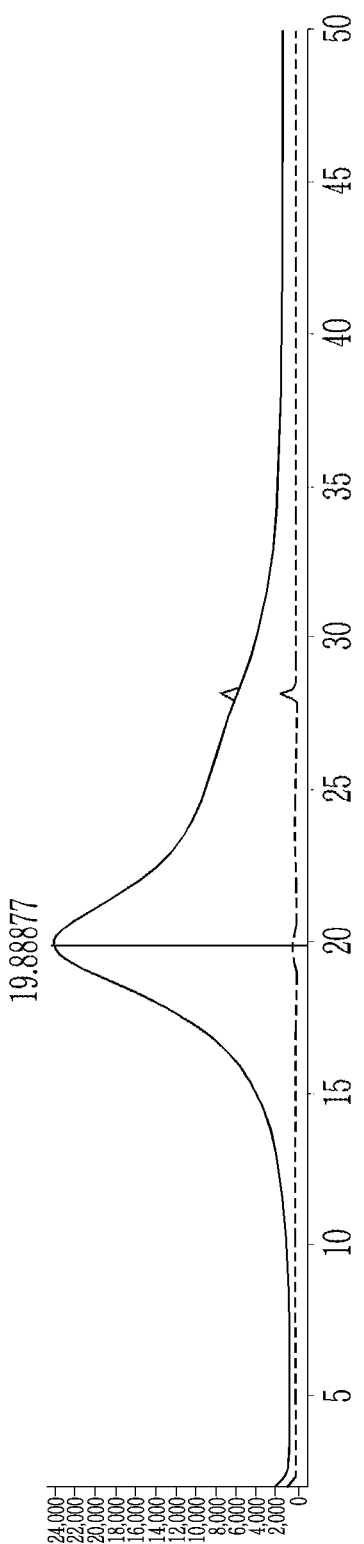
FIG. 6C is a graph of intensity (a.u.) versus diffraction angle (degrees 2-theta), which shows an X-ray diffraction spectrum of the nanoclay-polymer composite according to Comparative Example 4.

An X-ray diffraction analysis of the polymerization product is performed, and the result is shown in FIG. 6C. Impact strength and moisture transmission resistivity of the specimen are measured, and the results are shown in Table 2.

Referring to the results of FIGS. 6A, 6B, and 6C and Table 2, an X-ray diffraction pattern of the polymerization product according to Example 4 shows not an intrinsic nanoclay peak but a liquid crystal polymer peak alone. This result implies that nanoclays are peeled off without an actual agglomeration but dispersed in a liquid crystal polymer.

Referring the result of FIG. 6C, an X-ray diffraction pattern of the composite obtained by blending shows an intrinsic nanoclay peak.

Comparative Example 5

A polymerization product is prepared according to the same method as Example 2 except for using 4-hydroxybenzoic acid (HBA), 2-hydroxy-6-naphthoic acid (HNA), and polyethylene terephthalate (PET, IV/0.80, COOH/max 35 meg/kg, MP/253° C., Manufacturer: Samyang Corp. Trade name: BB) as a monomer for a liquid crystal polymer as shown in Table 1 and nanoclay (Cloisite 20A, Rockwood Clay Additives GmbH) in a content shown in Table 1.

The polymerization product includes a plurality of foams and thus does not form a composite in which nanoclay is dispersed.

TABLE 1

| | Nano-clay | | LCP composition** | | | | | | Dispersion method of |
|---|---|---|---|---|---|---|---|---|---|
| | types | Amount* | HBA | HNA | TPA | HQ | BP | PET | nanoclay |
| Example 1 | C30B | 0.9 | 60 | | 15 | 5 | 10 | 10 | In-situ |
| Comparative Example 1-1 | — | — | 60 | | 15 | 5 | 10 | 10 | Nanoclay is not used |
| Comparative Example 1-2 | C30B | 0.9 | 60 | | 15 | 5 | 10 | 10 | blend |
| Example 2 | 20A | 0.9 | 65.7 | 24.3 | | | | 10 | In-situ |
| Comparative Example 2-1 | — | — | 65.7 | 24.3 | | | | 10 | Nanoclay is not used |
| Comparative Example 2-2 | 20A | 0.9 | 65.7 | 24.3 | | | | 10 | blend |
| Comparative Example 2-3 | — | — | 65.7 | 24.3 | | | | 0 | Nanoclay is not used |
| Example 3 | Attapulgite | 0.9 | 65.7 | 24.3 | | | | 10 | In-situ |
| Comparative Example 3 | Attapulgite | 0.9 | 65.7 | 24.3 | | | | 10 | blend |
| Example 4 | Laponite | 0.9 | 65.7 | 24.3 | | | | 10 | In-situ |
| Comparative Example 4 | Laponite | 0.9 | 65.7 | 24.3 | | | | 10 | blend |
| Comparative Example 5 | 20A | 2.0 | 65.7 | 24.3 | | | | 10 | In-situ |

*The amount of nanoclay is based on 100 parts by weight of LCP.
**LCP composition refers to a mole ratio of monomers in the polymerization

TABLE 2

| | The number of peak, 2θ values (examination 2θ range: 2 degrees-30 degrees) | Impact strength (kJ/m$^2$) | moisture transmission resistivity (g/m$^2$ · day) |
|---|---|---|---|
| Example 1 | 1, 2θ = 19.57° | 95.5 | 0.047 |
| Comparative Example 1-1 | 1, 2θ = 19.58° | 4.06 | 0.05 |
| Example 2 | 1, 2θ = 19.77° | 38.6 | 0.027 |
| Comparative Example 2-1 | 1, 2θ = 19.76° | 19.85 | 0.023 |
| Comparative Example 2-2 | 2 or more | 20.15 | |
| Comparative Example 2-3 | 1, 2θ = 19.76° | 14.2 | 0.08 |
| Example 3 | 1, 2θ = 19.82° | 37.4 | |
| Comparative Example 3 | 2 or more | 19.42 | |
| Example 4 | 1, 2θ = 19.76° | 23.7 | |
| Comparative Example 4 | 2 or more | 17.6 | |
| Comparative Example 5 | synthesis failure (production of foam due to the excess of the modifier) | | |

Referring to Table 2, articles obtained by respectively molding the polymerization products (in other words, composites) according to Examples 1 to 4 maintains or improves moisture transmission resistivity and shows substantially improved impact strength. The molded articles from the polymerization products according to Comparative Examples show no substantially improved or remarkably deteriorated impact strength.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A battery casing comprising,
a container configured to house an electrode assembly, wherein
the container comprises a bottom wall and a plurality of side walls,
the bottom wall and the plurality of side walls are integrated to define an open side opposite to the bottom wall and to define a space for housing the electrode assembly,
at least one of the bottom wall and the plurality of side walls comprises a composite comprising a thermotropic liquid crystal polymer and a nanoclay dispersed in the thermotropic liquid crystal polymer,
at least a portion of the nanoclay is present in an exfoliated state, and
an X-ray diffraction pattern of the composite does not exhibit an intrinsic peak corresponding to the nanoclay,
wherein a main chain of the thermotropic liquid crystal polymer comprises:
a first repeating unit derived from a substituted or unsubstituted p-hydroxybenzoic acid,
a second repeating unit comprising a polyalkylene terephthalate moiety, a polyalkylene naphthalate moiety, a polyalkylene isophthalate moiety, or a combination thereof, and
a third repeating unit derived from an aromatic dicarboxylic acid or an aromatic hydroxycarboxylic acid,
wherein the aromatic dicarboxylic acid comprises terephthalic acid, isophthalic acid, 2,6-naphthalenedicarboxylic acid, 1,6-naphthalenedicarboxylic acid, 2,7-naphthalenedicarboxylic acid, 1,4-naphthalenedicarboxylic acid, 4,4'-dicarboxybiphenyl, an ester-producible derivative thereof, or a combination thereof,
wherein the aromatic hydroxycarboxylic acid comprises m-hydroxybenzoic acid, o-hydroxybenzoic acid, 6-hydroxy-2-naphthoic acid, 5-hydroxy-2-naphthoic acid, 3-hydroxy-2-naphthoic acid, 4'-hydroxyphenyl-4-benzoic acid, 3'-hydroxyphenyl-4- benzoic acid, 4'-hydroxyphenyl-3-benzoic acid, an ester-producible derivative thereof, or a combination thereof, wherein a total amount of the nanoclay in the composite is less than about 2.5 parts by weight, based on 100 parts by weight of the thermotropic liquid crystal polymer, and wherein the at least one of the bottom wall and the plurality of side walls comprising the composite is a molded article of the composite and the molded article has an unnotched Izod impact strength of greater than or equal to about 21 kilojoules per square meter as measured according ASTM D256.

2. The battery casing of claim 1, wherein the container further comprises a plurality of cell compartments separated by at least one partition wall disposed in the space.

3. The battery casing of claim 1, wherein the battery casing further comprises a lid configured to cover at least a portion of the open side of the container and comprising at least one of a positive terminal and a negative terminal.

4. The battery casing of claim 3, wherein the lid comprises a material which is the same as a material of the container.

5. The battery casing of claim 1, wherein in the thermotropic liquid crystal polymer, an amount of the first repeating unit is greater than or equal to about 30 mole percent and less than or equal to about 80 mole percent, based on total mole number of repeating units.

6. The battery casing of claim 1, wherein the first repeating unit has a polymerization degree of about 2 to about 5.

7. The battery casing of claim 1, wherein the first repeating unit comprises at least two p-hydroxybenzoic acid moieties.

8. The battery casing of claim 1, wherein the second repeating unit comprises the polyalkylene terephthalate moiety.

9. The battery casing of claim 1, wherein an amount of the second repeating unit is greater than or equal to about 5 mole percent and less than or equal to about 15 mole percent, based on total mole number of repeating units.

10. The battery casing of claim 1, wherein the thermotropic liquid crystal polymer further comprises a fourth repeating unit derived from an aromatic diol.

11. The battery casing of claim 10, wherein the aromatic diol comprises hydroquinone, resorcinol, 2,6-dihydroxynaphthalene, 2,7-dihydroxynaphthalene, 1,6-dihydroxynaphthalene, 1,4-dihydroxynaphthalene, 4,4'-dihydroxybiphenyl, 3,3'-dihydroxybiphenyl, 3,4'-dihydroxybiphenyl, 4,4'-dihydroxybiphenylether, an ester-producible derivative thereof, or a combination thereof.

12. The battery casing of claim 1, wherein an amount of the nanoclay is less than or equal to about 2 parts by weight, based on 100 parts by weight of the thermotropic liquid crystal polymer.

13. The battery casing of claim 1, wherein the X-ray diffraction pattern of the composite does not have a peak in a range of about 2 degrees 2θ to about 10 degrees 2θ.

14. The battery casing of claim 1, wherein the X-ray diffraction pattern of the composite does not have a peak in a range of about 25 degrees 2θ to 32 degrees 2θ.

15. The battery casing of claim 1, wherein the X-ray diffraction pattern of the composite has a peak corresponding to the liquid crystal polymer in a range of about 18 degrees 2θ to about 21 degrees 2θ.

16. The battery casing of claim 1, wherein the composite comprises a polymerization product of a mixture of the nanoclay and monomers for the thermotropic liquid crystal polymer.

17. The battery casing of claim 1, wherein the nanoclay comprises smectite, mica, vermiculite, montmorillonite, iron-containing montmorillonite, beidellite, saponite, hectorite, stibnite, nontronite, anionic clay, zirconium phosphate, kaolinite, attapulgite, laponite, illite, halloysite, diatomaceous earth, Fuller's earth, calcined aluminum silicate, hydrated aluminum silicate, magnesium aluminum silicate, sodium silicate, magnesium silicate, or a combination thereof.

18. The battery casing of claim 1, wherein the nanoclay comprises an organic modified nanoclay having a surface substituted with an organic compound.

19. The battery casing of claim 18, wherein the organic compound comprises a quaternary ammonium salt having a structure represented by Chemical Formula 2:

$$NTR_3^+A^- \qquad \text{Chemical Formula 2}$$

wherein, in Chemical Formula 2, R is hydrogen, a C1 to C30 substituted or unsubstituted alkyl group, or a C6 to C30 substituted or unsubstituted aryl group, T is a C3 to C40 substituted or unsubstituted aliphatic or aromatic hydrocarbon group, and A⁻ is a halide anion.

20. The battery casing of claim 1, wherein the nanoclay comprises a nanoclay that does not have a surface that is substituted with an organic compound.

21. The battery casing of claim 1, wherein the molded article has an impact strength of greater than or equal to about 37.4 kilojoules per square meter as measured according to ASTM D256.

22. The battery casing of claim 1, wherein the molded article has a water vapor transmittance rate of less than or equal to about 0.05 gram per square meter per day as measured at 38° C. and a relative humidity of 100% according to ISO 15106 or ASTM F 1249.

23. The battery casing of claim 1, wherein the molded article does not comprise a defect caused by loss of the composite from an inlet of an injection mold.

24. A battery comprising
the battery casing of claim 1; and
at least one electrode assembly housed in the container of the battery casing.

25. The battery of claim 24, wherein the battery has a modular shape and comprises a plurality of electrode assemblies.

26. A battery casing comprising
a container configured to house an electrode assembly,
wherein the container comprises:
a bottom wall and a plurality of side walls,
the bottom wall and the plurality of side walls are integrated to define an open side opposite to the bottom wall and to define a space for housing the electrode assembly,
at least one of the bottom wall and the plurality of side walls comprises a composite comprising a thermotropic liquid crystal polymer and a nanoclay dispersed in the thermotropic liquid crystal polymer,
wherein a main chain of the thermotropic liquid crystal polymer comprises an aromatic oxycarbonyl repeating unit and an alkylene moiety-containing repeating unit, and
at least a portion of the nanoclay is present in an exfoliated state, and
an X-ray diffraction pattern of the composite does not exhibit an intrinsic peak corresponding to the nanoclay,
wherein the nanoclay comprises smectite, mica, vermiculite, montmorillonite, iron-containing montmorillonite, beidellite, saponite, hectorite, stibnite, nontronite, anionic clay, zirconium phosphate, kaolinite, attapulgite, laponite, illite, halloysite, diatomaceous earth, Fuller's earth, calcined aluminum silicate, hydrated aluminum silicate, magnesium aluminum silicate, sodium silicate, magnesium silicate, or a combination thereof, and wherein the nanoclay does not have a surface that is substituted with an organic compound.

27. The battery casing of claim 26, wherein the nanoclay comprises beidellite, stibnite, anionic clay, zirconium phosphate, kaolinite, attapulgite, laponite, illite, halloysite, diatomaceous earth, Fuller's earth, calcined aluminum silicate, hydrated aluminum silicate, magnesium aluminum silicate, sodium silicate, magnesium silicate, or a combination thereof.

* * * * *